United States Patent [19]

Stafford et al.

[11] 3,833,888

[45] Sept. 3, 1974

[54] GENERAL PURPOSE DIGITAL PROCESSOR FOR TERMINAL DEVICES

[75] Inventors: John P. Stafford; Allen B. J. Cuccio, both of Oklahoma City, Okla.; Arthur Johnson, Syracuse, N.Y.

[73] Assignee: Honeywell Information Systems, Inc., Waltham, Mass.

[22] Filed: Feb. 5, 1973

[21] Appl. No.: 329,513

[52] U.S. Cl. .......... 340/172.5
[51] Int. Cl. .......... G06f 9/18
[58] Field of Search .......... 340/172.5

[56] References Cited

UNITED STATES PATENTS

| | | | |
|---|---|---|---|
| 3,297,994 | 1/1967 | Klein | 340/172.5 |
| 3,344,401 | 9/1967 | MacDonald et al. | 340/172.5 |
| 3,390,379 | 6/1968 | Carlson et al. | 340/172.5 |
| 3,407,387 | 10/1968 | Looschen et al. | 340/172.5 |
| 3,413,613 | 11/1968 | Bahrs et al. | 340/172.5 |
| 3,728,693 | 4/1973 | Macker et al. | 340/172.5 |
| 3,737,861 | 6/1973 | O'Neill et al. | 340/172.5 |
| 3,742,457 | 6/1973 | Calle et al. | 340/172.5 |

*Primary Examiner*—Gareth D. Shaw
*Assistant Examiner*—Mark Edward Nusbaum
*Attorney, Agent, or Firm*—Pershon, James A.

[57] ABSTRACT

A digital processor includes: a main read only memory store providing instruction and constant data signals; a random access memory store for storing variable data signals; an input/output port unit communicating with the terminal devices; an interrupt address generator controlling the interrupt priority for the terminal devices; an arithmetic and logical unit; an instruction decoding and execution unit controlled according to instructions in a fast access read only memory store address controlled by the instruction signals in the main read only memory store for controlling the operations of the digital processor; and a group of working and general registers for buffer storage of digital signals. Interconnections between the units of the processor are through a single bidirectional data bus. Process steps control the operation of the processor according to an instruction format.

9 Claims, 32 Drawing Figures

| | R | L | N1 | N2 | N3 | OPER. | B1 | B2 | B3 | B4 | B5 | B6 | B7 | B8 | |
|---|---|---|---|---|---|---|---|---|---|---|---|---|---|---|---|
| SHIFT RIGHT | 1 | 0 | 0 | 0 | 0 | R0 | B1 | B2 | B3 | B4 | B5 | B6 | B7 | B8 | INPUT DATA BITS |
| | 1 | 0 | 0 | 0 | 1 | R1 | — | B1 | B2 | B3 | B4 | B5 | B6 | B7 | |
| | 1 | 0 | 0 | 1 | 0 | R2 | — | — | B1 | B2 | B3 | B4 | B5 | B6 | |
| | 1 | 0 | 0 | 1 | 1 | R3 | — | — | — | B1 | B2 | B3 | B4 | B5 | |
| | 1 | 0 | 1 | 0 | 0 | R4 | — | — | — | — | B1 | B2 | B3 | B4 | |
| | 1 | 0 | 1 | 0 | 1 | R5 | — | — | — | — | — | B1 | B2 | B3 | |
| | 1 | 0 | 1 | 1 | 0 | R6 | — | — | — | — | — | — | B1 | B2 | |
| | 1 | 0 | 1 | 1 | 1 | R7 | — | — | — | — | — | — | — | B1 | |
| CIRCULAR MODE | 1 | 1 | 0 | 0 | 0 | R0, L0 | B1 | B2 | B3 | B4 | B5 | B6 | B7 | B8 | INPUT DATA BITS |
| | 1 | 1 | 0 | 0 | 1 | R1, L7 | B8 | B1 | B2 | B3 | B4 | B5 | B6 | B7 | |
| | 1 | 1 | 0 | 1 | 0 | R2, L6 | B7 | B8 | B1 | B2 | B3 | B4 | B5 | B6 | |
| | 1 | 1 | 0 | 1 | 1 | R3, L5 | B6 | B7 | B8 | B1 | B2 | B3 | B4 | B5 | |
| | 1 | 1 | 1 | 0 | 0 | R4, L4 | B5 | B6 | B7 | B8 | B1 | B2 | B3 | B4 | |
| | 1 | 1 | 1 | 0 | 1 | R5, L3 | B4 | B5 | B6 | B7 | B8 | B1 | B2 | B3 | |
| | 1 | 1 | 1 | 1 | 0 | R6, L2 | B3 | B4 | B5 | B6 | B7 | B8 | B1 | B2 | |
| | 1 | 1 | 1 | 1 | 1 | R7, L1 | B2 | B3 | B4 | B5 | B6 | B7 | B8 | B1 | |
| SHIFT LEFT | 0 | 1 | 0 | 0 | 0 | L0 | — | — | — | — | — | — | — | — | INPUT DATA BITS |
| | 0 | 1 | 0 | 0 | 1 | L7 | B8 | — | — | — | — | — | — | — | |
| | 0 | 1 | 0 | 1 | 0 | L6 | B7 | B8 | — | — | — | — | — | — | |
| | 0 | 1 | 0 | 1 | 1 | L5 | B6 | B7 | B8 | — | — | — | — | — | |
| | 0 | 1 | 1 | 0 | 0 | L4 | B5 | B6 | B7 | B8 | — | — | — | — | |
| | 0 | 1 | 1 | 0 | 1 | L3 | B4 | B5 | B6 | B7 | B8 | — | — | — | |
| | 0 | 1 | 1 | 1 | 0 | L2 | B3 | B4 | B5 | B6 | B7 | B8 | — | — | |
| | 0 | 1 | 1 | 1 | 1 | L1 | B2 | B3 | B4 | B5 | B6 | B7 | B8 | — | |

(Columns B1–B8: OUTPUT DATA BITS)

ALU/SHIFTER

| OP CODE | 0 1 | 0 0 0 0 2 3 4 5 | 0 0 0 6 7 8 | 0 1 1 1 1 1 1 1 9 0 1 2 3 4 5 6 | 1 1 1 7 8 9 | 2 2 2 2 2 2 2 2 2 2 3 3 3 0 1 2 3 4 5 6 7 8 9 0 1 2 | OPERATION |
|---|---|---|---|---|---|---|---|
| HLT | 0 | 0 0 0 0 | USER REGISTER | | NOT USED | | Halt |
| IRET | 0 | 0 0 0 1 | | | | | Interrupt Return |
| SRET | 0 | 0 0 1 0 | | RAM LOC OF PC | | | Subroutine Return |
| IN | 0 | 0 0 1 1 | | USER PORT | | | Input from Port |
| OUT | 0 | 0 1 0 0 | | | | | Output to Port |
| SHFT | 0 | 0 1 0 1 | | L R NOS | | | Shift |
| ADI | 0 | 1 0 0 0 | | IMMEDIATE OPERAND | | | Add Immediate |
| ANI | 0 | 1 0 0 1 | | | | | AND Immediate |
| XOT | 0 | 1 0 1 0 | | | | | XOR Immediate |
| LDI | 0 | 1 0 1 1 | | | | | LOAD Immediate |
| ORI | 0 | 1 1 0 0 | | | | | OR Immediate |
| STR | 1 | 0 0 0 0 | | CHARACTER FOR MEMORY STORE | USER INDEX | MEMORY ADDRESS | Store in Memory Right |
| STL | 1 | 0 0 0 1 | | | | | Store in Memory Left |
| ADM | 1 | 0 0 1 0 | | 0 1 0 0 1 0 1 W | | | Add to Memory |
| ANM | 1 | | | 0 1 0 1 0 1 0 O | | | AND to Memory |
| XOM | 1 | | | 0 1 1 0 0 0 1 R | | | XOR to Memory |
| ORM | 1 | | | 0 1 1 0 1 0 0 D | | | OR to Memory |
| STM | 1 | | | 0 1 1 1 0 0 1 | | | Store in Memory |
| LDR | 1 | 0 0 1 1 | | 0 0 1 1 1 0 1 H | | | Load Register |
| ADR | 1 | | | 0 1 0 0 1 0 1 A | | | Add to Register |
| ANR | 1 | | | 0 1 0 1 0 1 0 L | | | AND to Register |
| XOR | 1 | | | 0 1 1 0 0 0 1 F | | | XOR to Register |
| ORR | 1 | | | 0 1 1 0 1 0 0 | | | OR to Register |
| ADQ | 1 | 0 1 0 0 | | | S.T. Q Adder | R.T. Q Adder | Add to Q Register |
| SUB | 1 | 0 1 1 0 | | RAM LOC FOR PC | | MEMORY ADDRESS | Call Subroutine |
| JU | 1 | 0 1 1 1 | | | | | Jump Unconditional |
| JBZ | 1 | 1 0 0 0 | | BIT MASK FOR TESTING UR | | | Jump Bit(s) Zero |
| JBNZ | 1 | 1 0 0 1 | | | | | Jump Bit(s) Not Zero |
| JE | 1 | 1 0 1 0 | | CHARACTER TO COMPARE WITH UR | | | Jump Equal |
| JNE | 1 | 1 0 1 1 | | | | | Jump Not Equal |

FIG. 11

GENERAL PURPOSE DIGITAL PROCESSOR FOR TERMINAL DEVICES

BACKGROUND OF THE INVENTION

This invention relates generally to a data processing system and more particularly to a processor organized for use by a variety of terminal devices.

Present-day technology for data processing systems is toward a highly sophisticated, high-speed, low access time digital processor. For many applications, such as a multitude of time sharing terminals, the requirement for high speed is necessary. The high speed, however, results in a high cost of the processor since logic units are duplicated to speed the operations of the processor. But where the requirement for the high speed is necessary, generally the cost of the processor bears a minor consideration.

However, in certain applications, the speed of the processor is relatively immaterial, while cost is the major factor. Such a system, for instance, could be a commercial terminal for use as a point of sale terminal in a retail department store or a terminal for use by a bank teller in a financial institution. The trend is for these terminals to perform preliminary data processing. A magnetic tape output could be provided for later batch processing in a high speed digital processor. The data processing performed by the terminal is limited by the speed at which a human being can operate the terminal. It matters little whether the processor can perform operations in nanoseconds since the operator's capability of entering the information is much slower.

The main considerations involved in this type of terminal are cost and size. Where one wishes to use a digital processor as part of such a terminal, it is necessary to make the cost of this type of terminal relatively competitive in price. Further, since the terminals are to be located on site, the size must be such that the processing performed by the terminal adds little space to the terminal. The added advantages which may be derived from using a digital processor as the heart of the data processing system must not be gained at the expense of cost and size that it becomes inefficient and impractical for a prospective purchaser to purchase one of the terminals.

SUMMARY OF THE INVENTION

The data processing system according to the present invention comprises a controller controlling the transmission and reception, and the processing of data information signals for a plurality of terminal devices. The terminal devices are connected to the controller via bidirectional leads inputting into an input/output port unit.

The controller includes: the input/output port unit controlling the transmission of data to and from the terminal or peripheral device; a main memory store having a random access portion for storing variable data and instruction signals and a read only portion for storing fixed data and instruction signals; an interrupt address generator responsive to requests for access signals emitted by the peripheral devices to the controller for interrupting the process being performed by the controller and generating an address to the main memory store according to a preset priority scheme; an address register for storing the address signals from the main memory store; a data register for storing the signals from the main memory store; a combined arithmetic, logical and shifting unit; spare and real time working registers, program counters, and indicator storage registers; a special counter register; an instruction decode and execution unit including a fast access read only memory store for constant instruction execution for controlling the operations of the units of the controller; and an instruction register storing the instructions from the main memory store for altering the addressing of the constant instruction in the fast access read only memory store. All data and instruction signal distribution between units of the controller are by a single bidirectional data bus.

The controller provides a universal interface to the peripheral devices. The instruction decode and execution unit by executing instruction signals, controls the number of ports, controls the number and types of leads allocated to each peripheral device with the arithmetic and logical unit, and controls the pulse widths and signal frequencies of the communicating signals with a program loadable counting register.

The controller further provides data manipulations such as storage, retransmission, arithmetic, logical, type indication and priority allotting of requests by the peripheral devices. The controller performs the data manipulations by distributing the instruction and data signals between all of the units on a single bus which transports the signals to and from the units. The instruction decode and execution unit provide the control signals to control the functional relationship of the units. Thus each functional unit will have all of the required data and instruction signals supplied to it by the data bus. This confers great flexibility to the controller inasmuch as data need not be processed through the instruction decode and execution unit for communication between the units. Also complex logic circuitry is not needed such as would be necessary for multiple interconnections between functional units.

It is, therefore, an object of the present invention to provide an enhanced controlling unit in a data processing system.

It is yet another object of the present invention to provide a controlling unit which transmits, receives and processes data signals for terminal devices and is adaptable for many terminal types.

It is still another object to provide a controller for processing data and instructions between separate functional units on a single data bus.

It is another object to provide a controller which provides a separate instruction memory, addressable by main memory, to control the operations of the separate function units.

It is yet another object to provide a process for controlling a controller in a data processing system by manipulating instruction signals stored in a read only fast access memory store addressable by a main memory store to regulate the steps performed by functional units of the controller.

These and other objects will become apparent to those skilled in the art as the description of the preferred embodiment proceeds.

BRIEF DESCRIPTION OF THE DRAWING

The various novel features of this invention, along with the foregoing and other objects, as well as the invention itself both as to its organization and method of operation, may be more fully understood from the following description of an illustrated embodiment when read in conjunction with the accompanying drawing, wherein.

FIG. *3a* is a logic diagram showing the portion of the logic and control of one bit of data information for several ports;

FIG. *3b* is a logic diagram showing the logic internal to a port as shown in FIG. *3a;*

Figure 2:
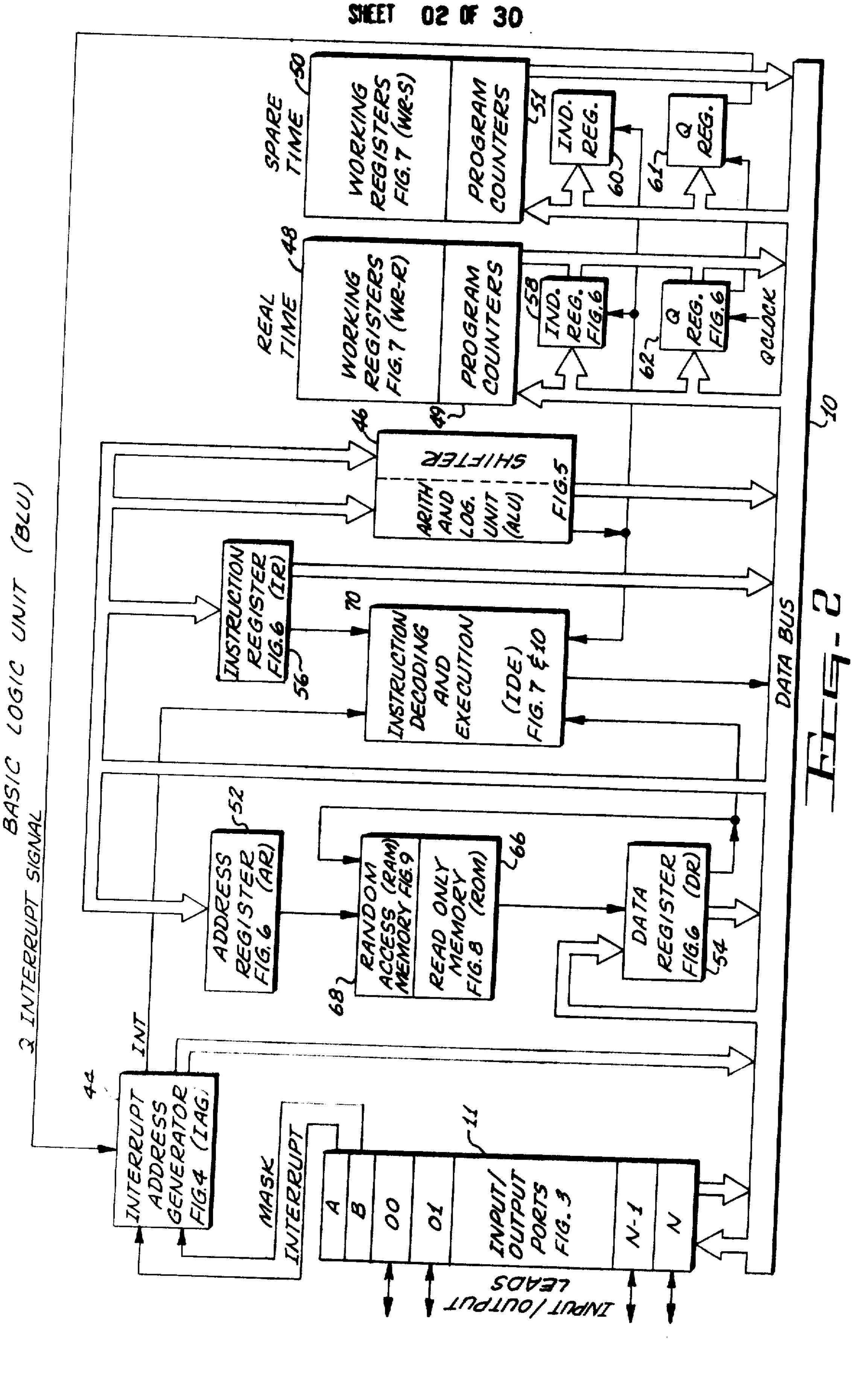
FIG. 2 is a block diagram of a controller or basic logic unit of FIG. 1 showing the interconnection of the functional units of the basic logic unit.
Figure 4:
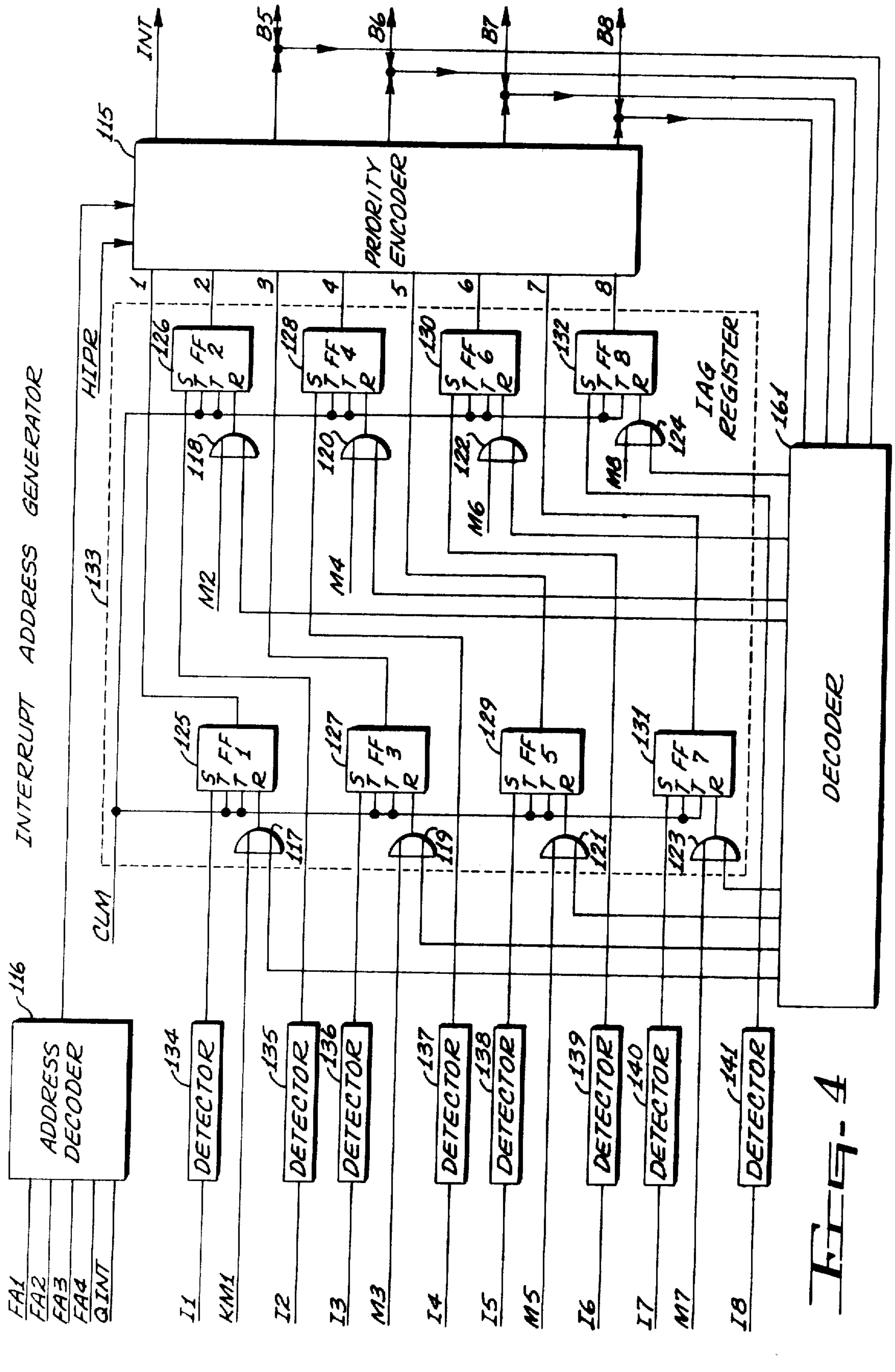
Figure 5:
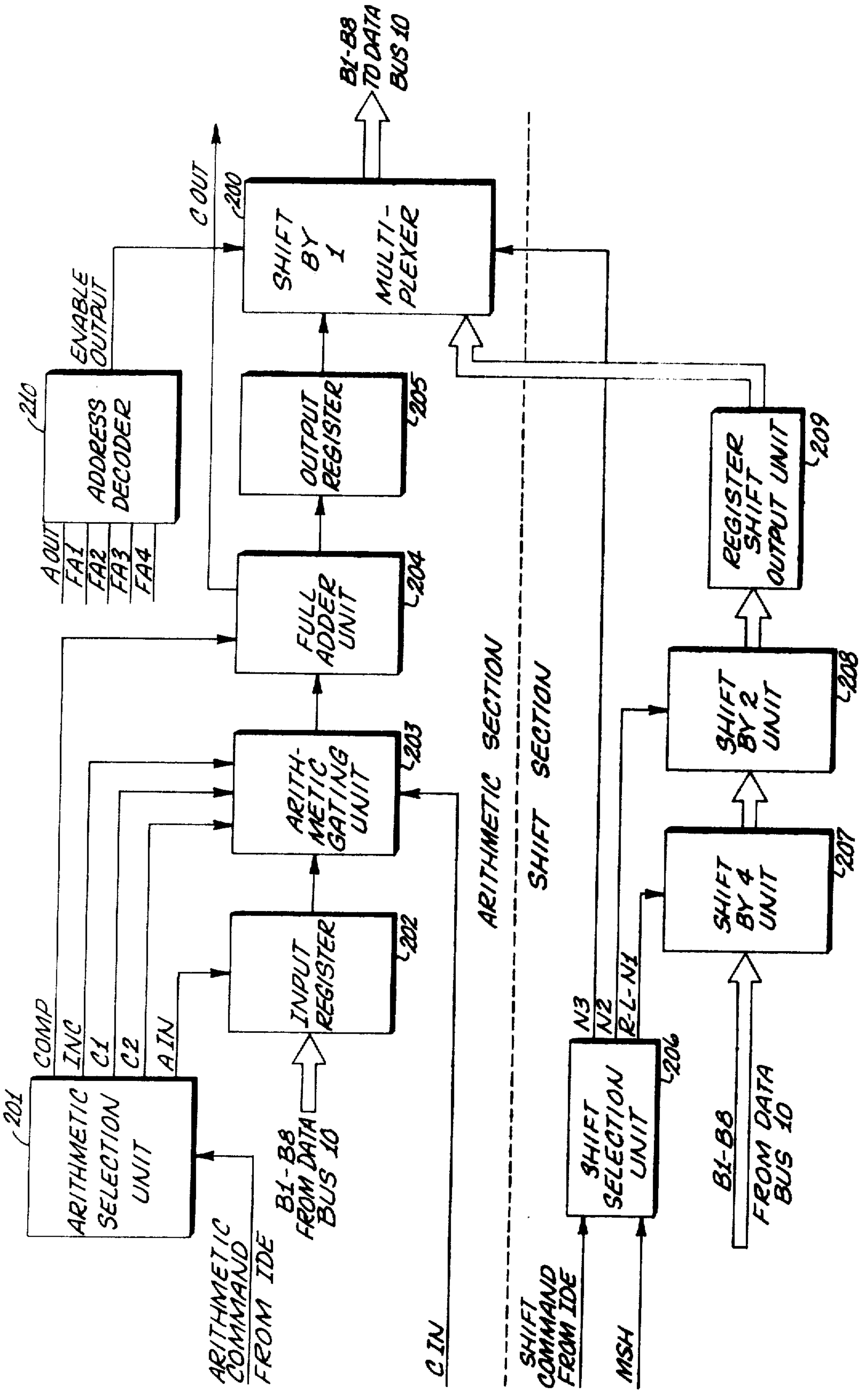
Figure 6:
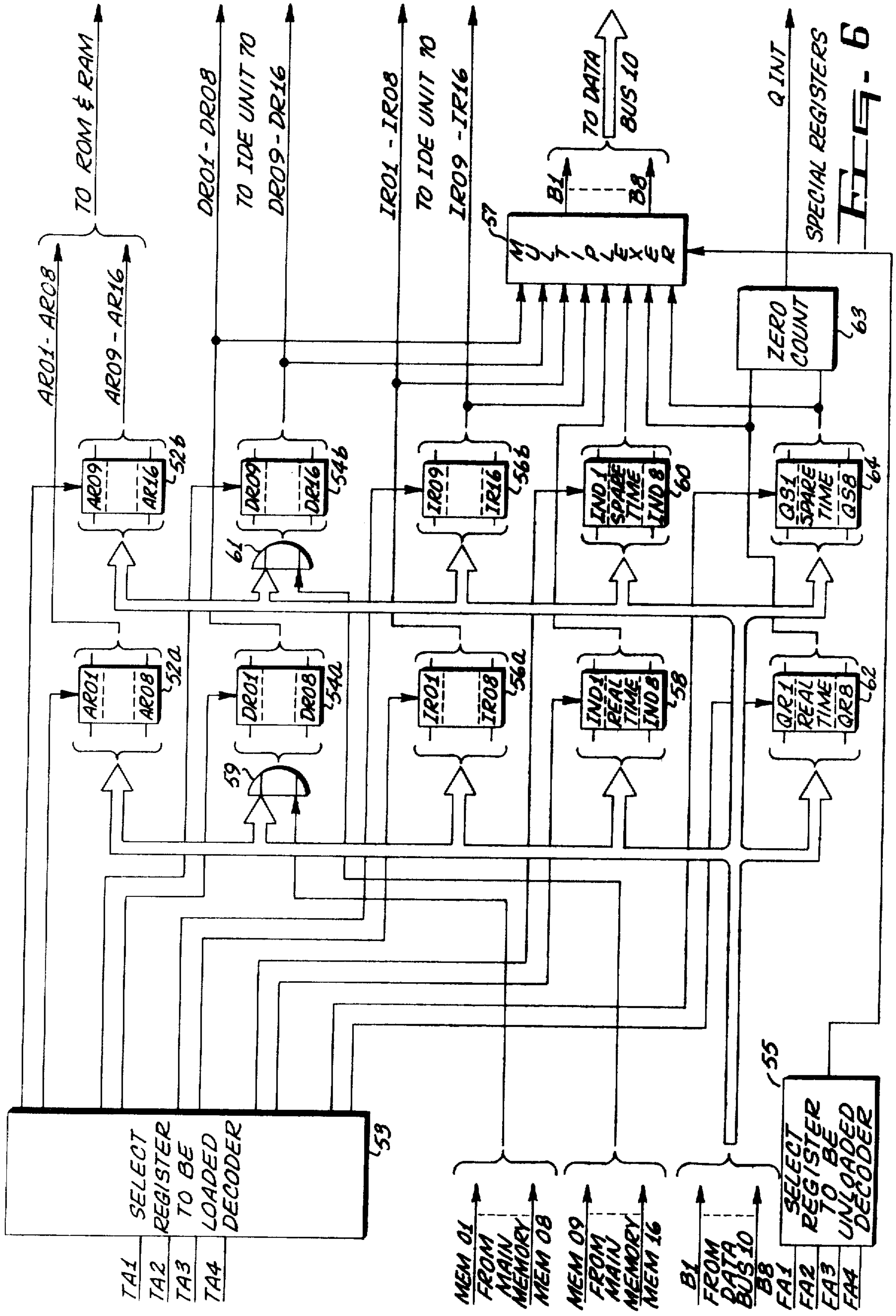
Figure 7:
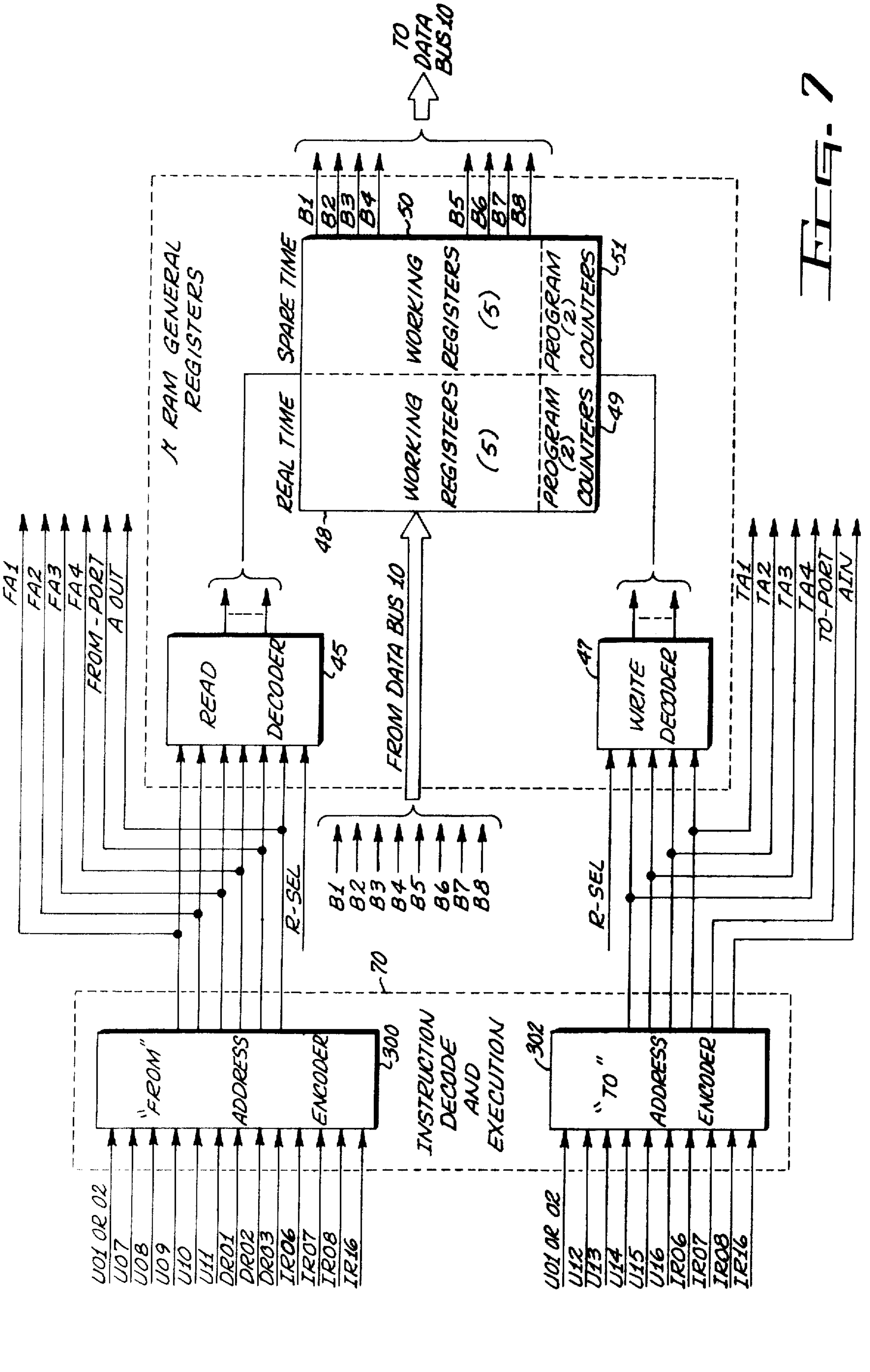
Figure 7A:
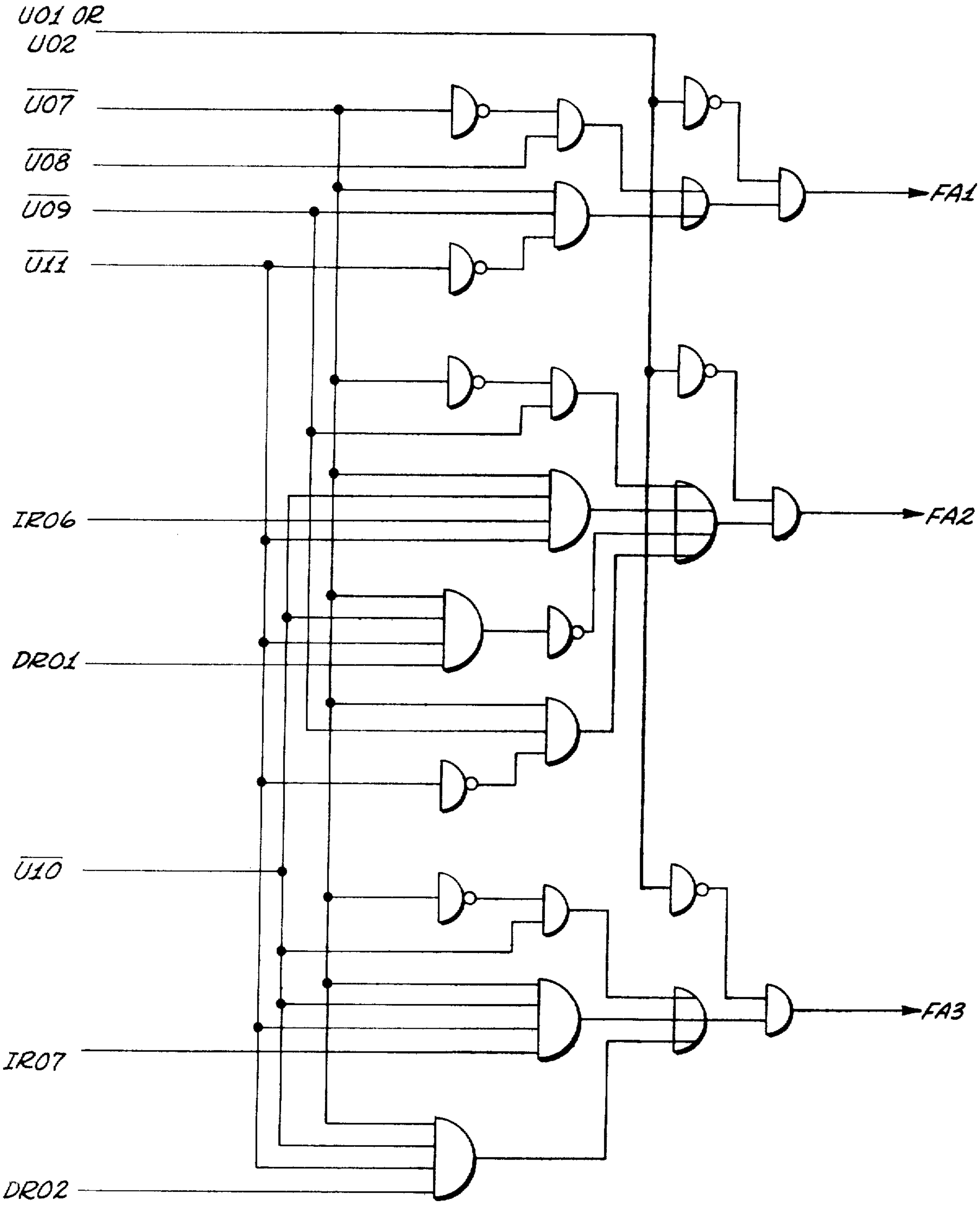
Figure 7B:
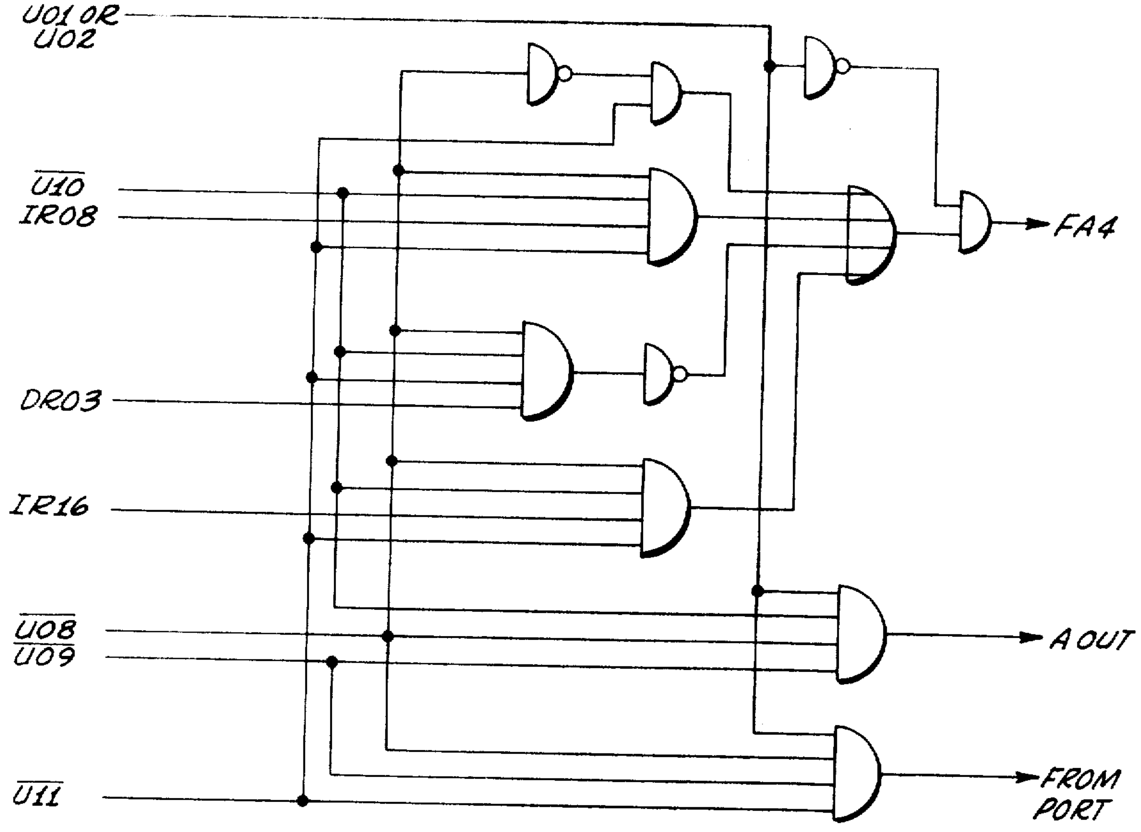
Figure 7C:
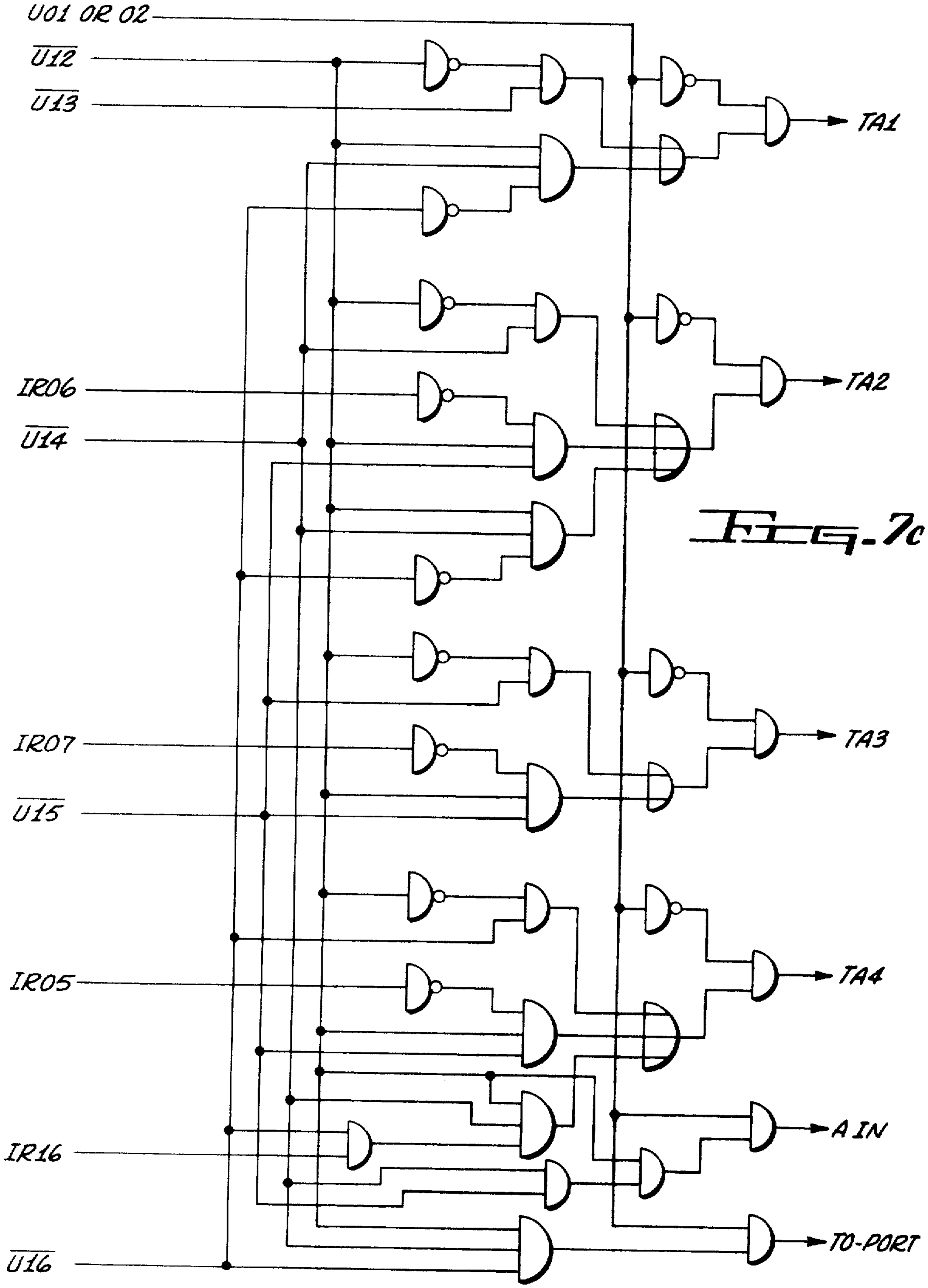
Figure 8:
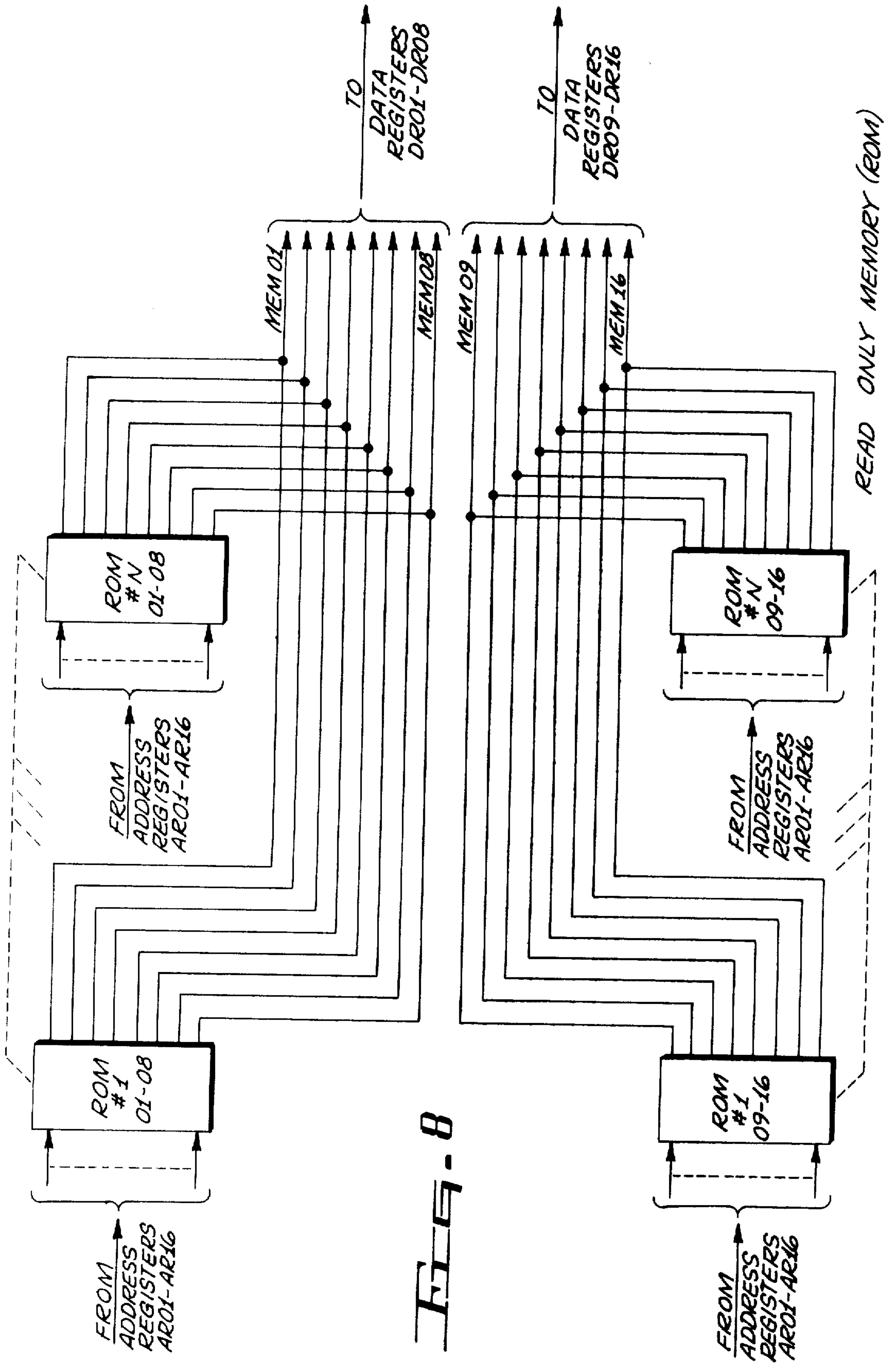
Figure 9:
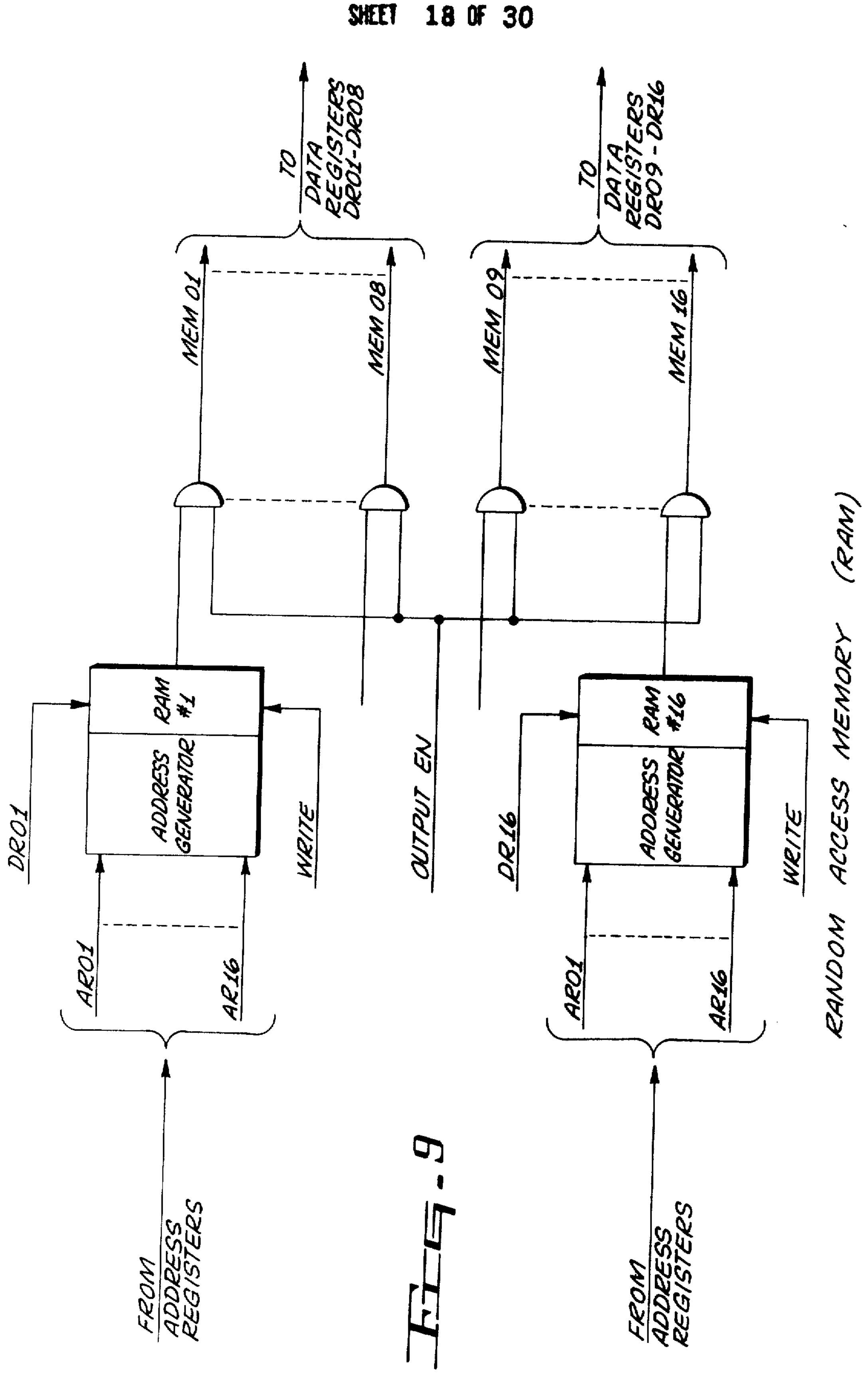
Figure 10:
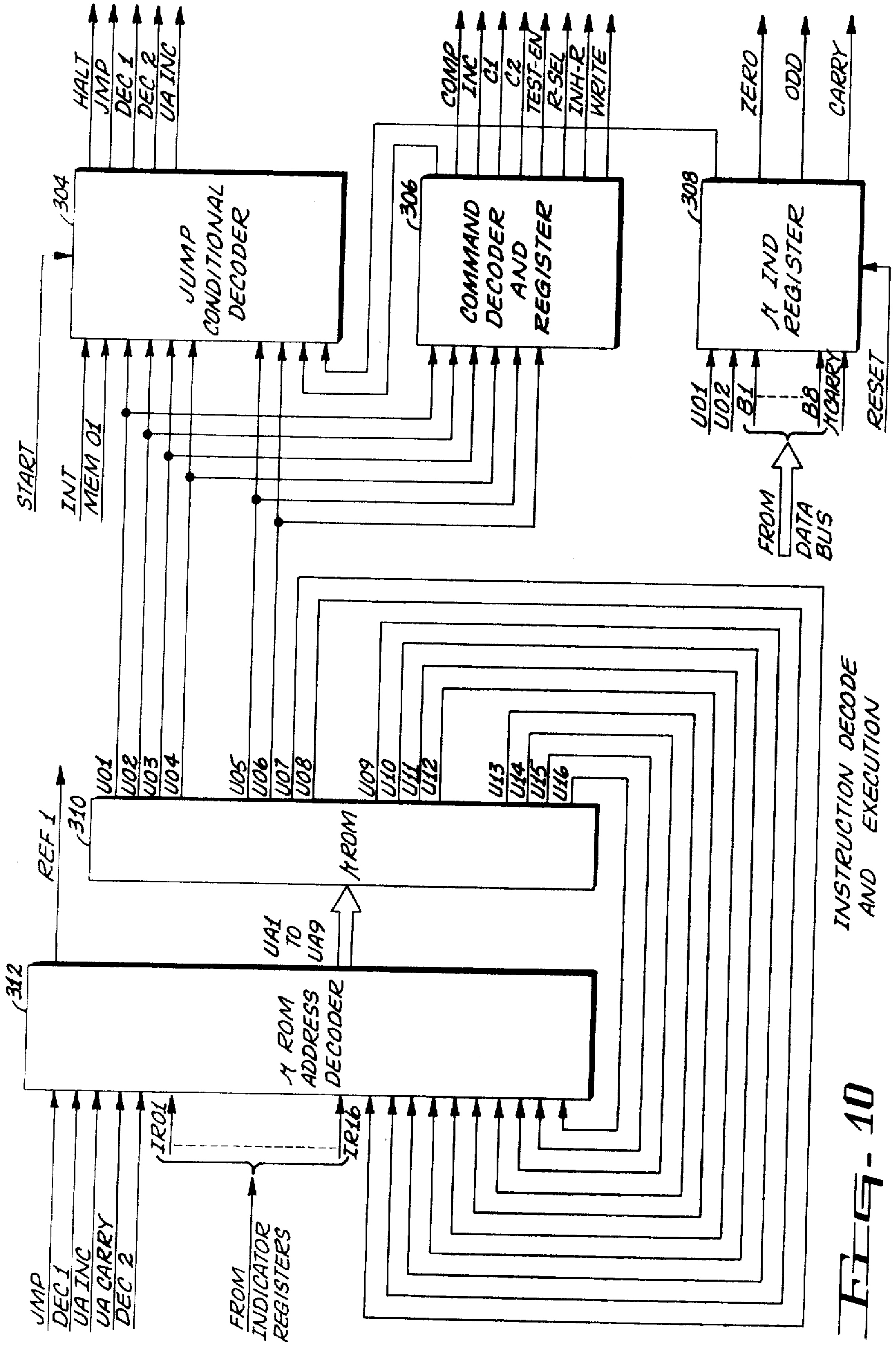
Figure 10A:
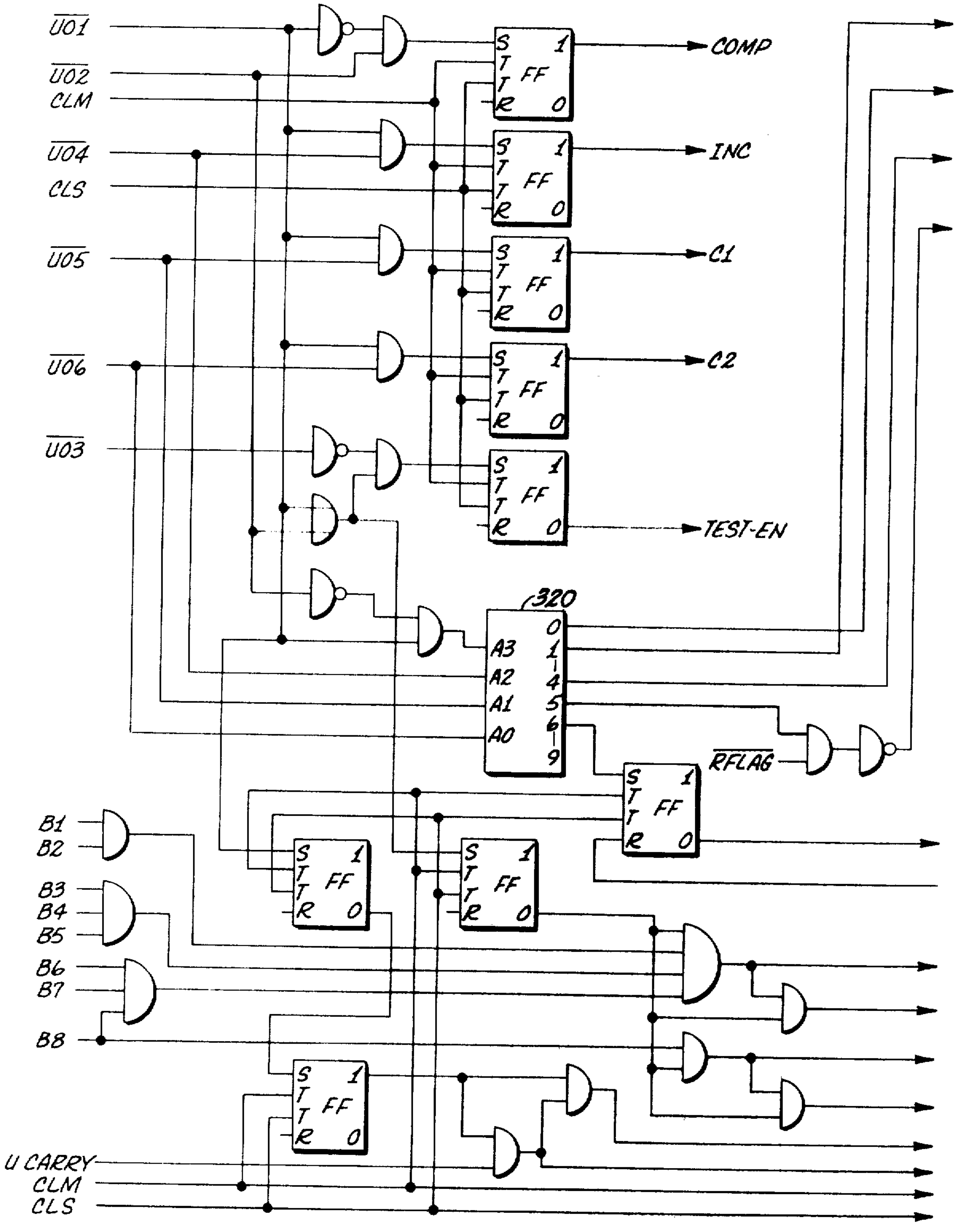
Figure 10B:
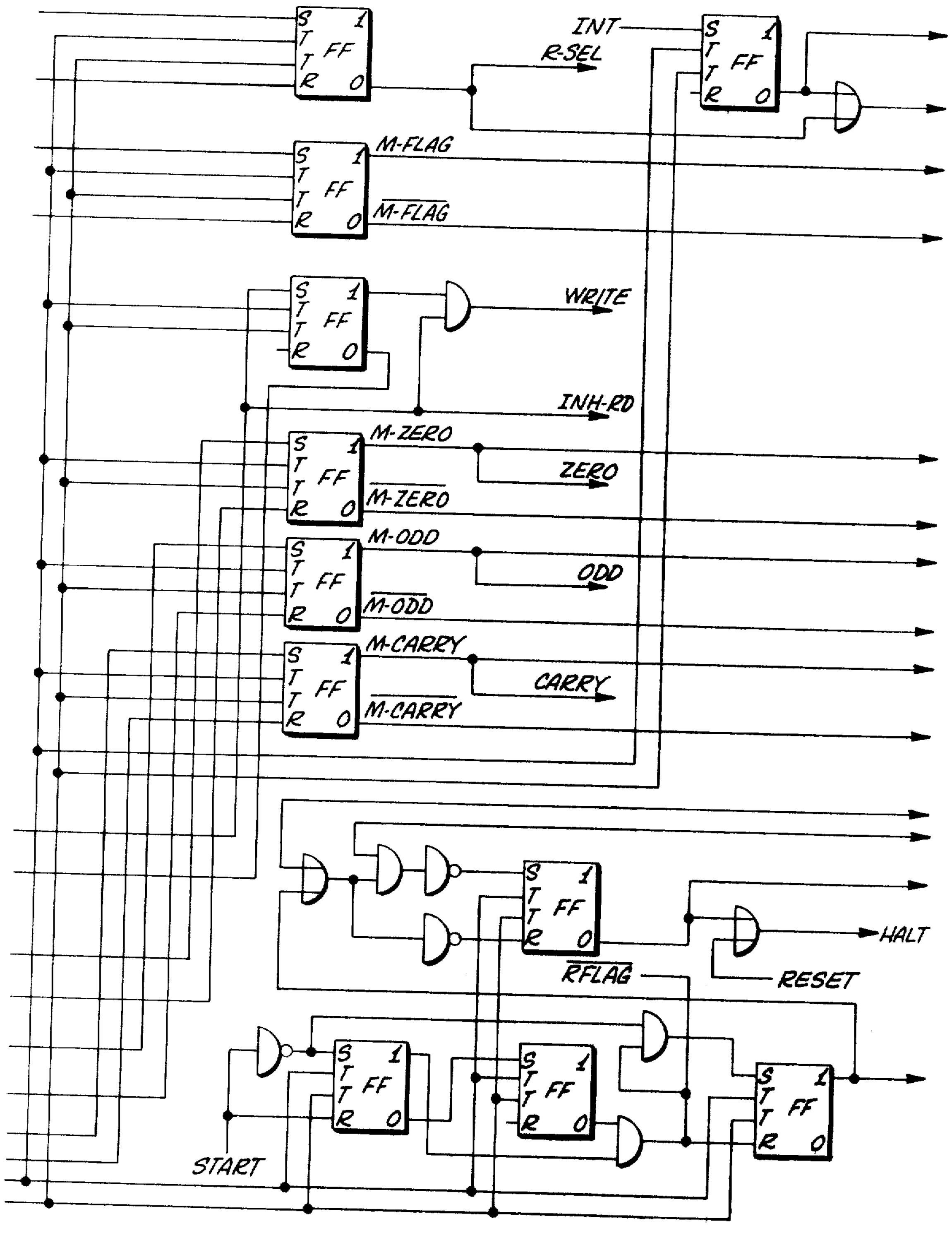
Figure 10C:
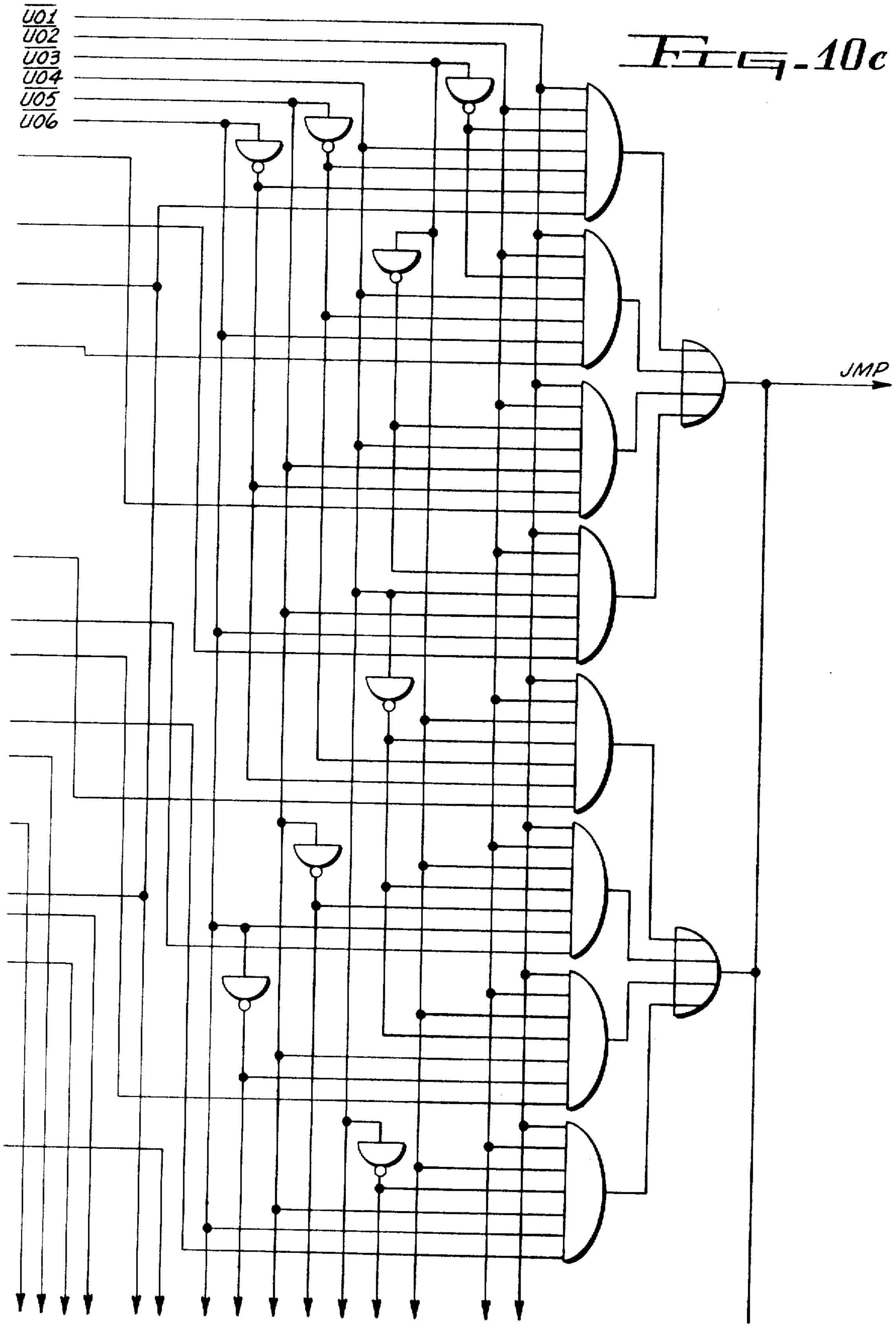
Figures 10D, 10E:
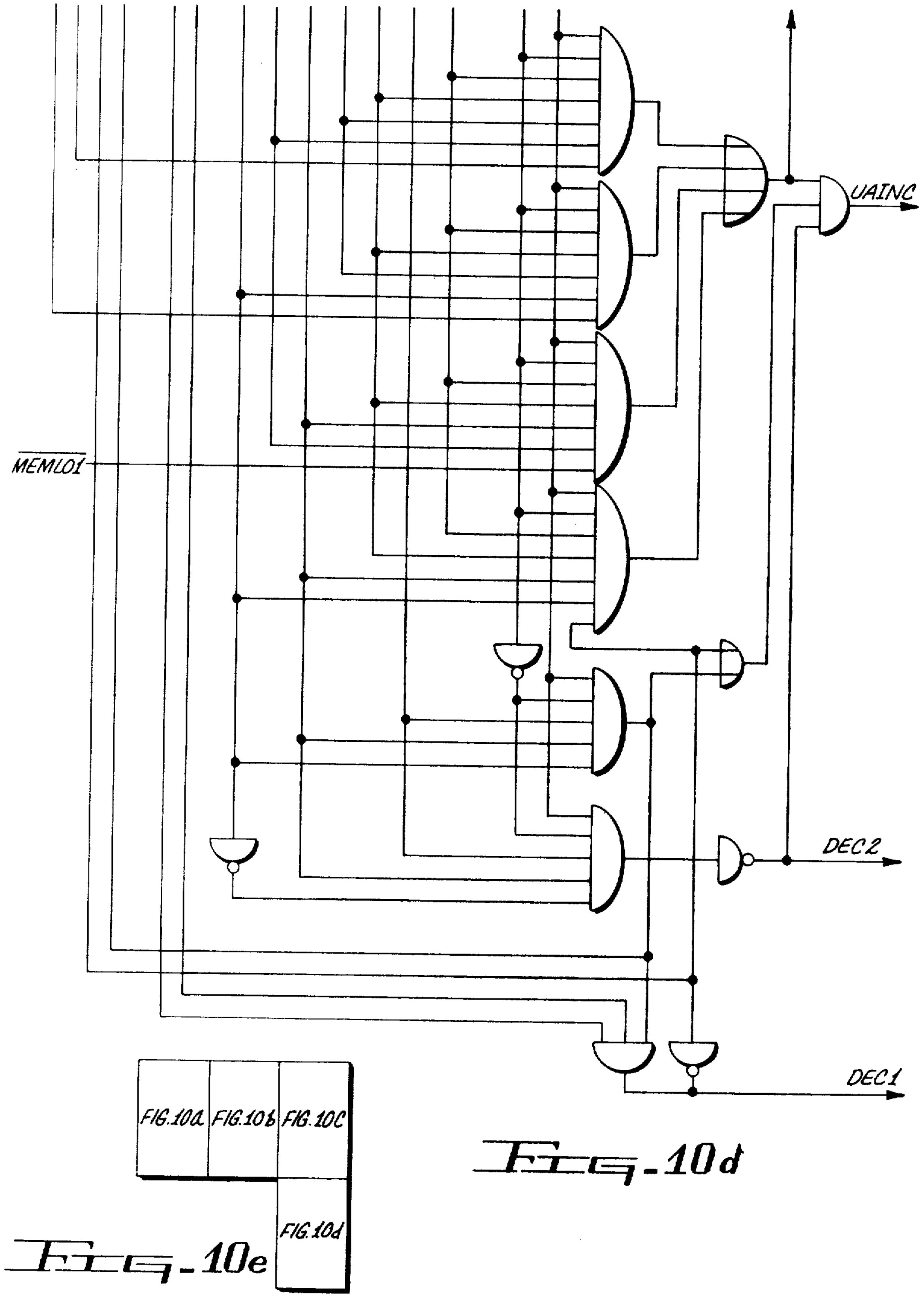

FIG. 4 is a block diagram of an interrupt address generator as shown in the block diagram of FIG. 2;

FIG. *4a* is a logic diagram showing the priority encoding feature of the interrupt address generator of FIG. 4;

FIG. 5 is a block diagram of the most significant half unit of the arithmetic, logical and shifter unit shown in FIG. 2;

FIGS. *5a* and *5b* are a logic diagram divided into blocks showing logic circuitry of the arithmetic and logical section according to FIG. 5;

FIG. *5c* is a logic diagram divided into blocks showing the logic circuitry of the units of the shift section according to FIG. 5;

FIG. *5d* is a truth table for an eight-bit position scaler showing the resultant bit positions after shifting according to the actuation of the shift selection and using the combined shift sections for the most significant half unit and the least significant half unit of FIG. 2;

FIG. 6 is a block diagram of the special registers used in the basic logic unit;

FIG. 7 is a block diagram of the general registers and a portion of the instruction decode and execution unit;

FIGS. *7a–c* are a logic diagram of the instruction decode and execution unit shown in FIG. 7;

FIG. 8 is a block diagram of the read only memory portion of the main memory store of the basic logic unit;

FIG. 9 is a block diagram of the random access memory portion of the main memory store of the basic logic unit;

FIG. 10 is a block diagram of the instruction decode and execution unit of the basic logic unit;

FIGS. 10*a–d* are a logic diagram of the decoders and registers of the instruction decode and execution unit shown in FIG. 10;

FIG. 10*e* is a diagram of the placement of FIGS. 10*a–d* to show the interconnection between the figures;

FIG. 11 is a diagram of the instruction format usable in the basic logic unit;

FIGS. 12*a–e* are a flow diagram of an instruction cycle of the basic logic unit.

DESCRIPTION OF THE PREFERRED EMBODIMENT

The fundamental object of the data processing system according to the present invention is to utilize one hardware design as the controller of a series of terminal products. This one hardware design for the purposes of this description will be called the basic logic unit or BLU. The BLU is capable of being adapted to different terminal device configurations and is programmable to meet varied functional and control requirements.

Figure 1:
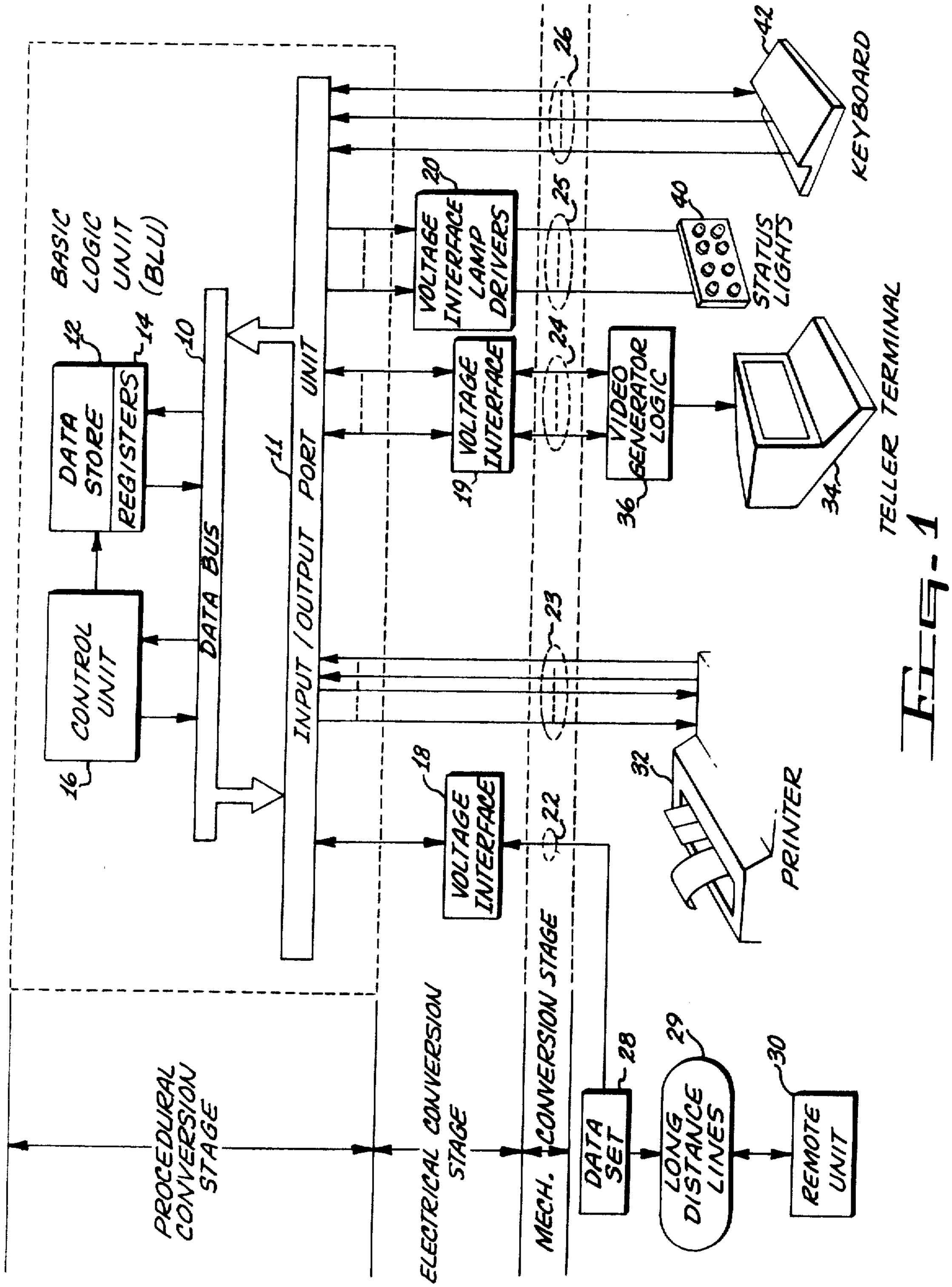
FIG. 1 is a block diagram showing the different stages for adapting a plurality of peripheral devices to a controlling unit.

As shown in FIG. 1, the BLU is a digital processor for terminal devices having a general purpose machine organization using a data bus arrangement 10 and comprising an input/output port unit 11 for controlling the transfer of data information into and out of the BLU, a data store 12 for storing the program for the functions of the different peripherals and the variable data information, registers 14 as buffers for intermediary transfer of data between the data bus 10 and the data store 12, and a control unit 16 to control the operation and execution of the different functions of the BLU. Coding stored in the data store 12 adapts the BLU hardware to the particular terminal application. This coding is referred to as firmware. The firmware is a program for controlling the operation of the different parts of the BLU, including the input/output ports 11. Thus by placing particular control programs in the data store 12, the BLU permits functional changeability with a minimum amount of device electronics to permit interfacing with a wide variety of low to medium speed terminal devices without the use of a special interface adapter.

The BLU adapts itself to the peripheral device rather than requiring the devices to adapt to the BLU, thus eliminating the need for special device adapter hardware. The BLU itself becomes the device adapter logic when operating with a given device by programming the input/output ports as having input and/or output leads, by selecting the number of leads required, by designating the selected leads as data or control leads, and by operating the leads for the information to be transmitted either in serial or in parallel. The input/output leads connecting the input/output ports 11 of the BLU with the different peripheral devices are identical. The signal parameters of these leads are firmware programmable to control the pulse widths, the signal frequencies, the signal identity, and the number of leads allocated to a different device. The device electronics either internal to the peripheral device or a voltage interface unit provides the drive, voltage level and impedance compatibility for the peripheral device.

The basic logic unit data processing system is shown in FIG. 1 attached to many different peripherals of the type typically used together as a bank teller terminal through a group of voltage interface units 18, 19 and 20 and cables 22–26. The teller terminal generally includes a dataset 28 to communicate with other terminals and the central data processing system, a printer 32 to produce statements of an account and to enter deposits and withdrawals into customer's passbooks, a CRT terminal 34 to display information such as the status of a loan to the operator, a status lights display unit 40 for guiding the operator through the operations, and a keyboard 42 to enter new data into the data processing system.

In the system according to the present invention, the basic logic unit is the procedural adaptation stage adapting the data and control inputs from the peripheral devices, the voltage interface units provide the electrical conversion stage, and the cables provide a mechanical conversion stage. The universal interface function of the basic logic unit is adaptable to a variety of peripheral digital devices. For example, procedural device interface could include: single leads for control information of serial data, four leads for packed decimal or hexa-decimal data, eight leads for character parallel transfer, and twelve leads for Hollerith information. The basic logic unit includes a priority interrupt mechanism for those devices whose time-critical functions require real time service. With the universal interface function of the BLU, some peripheral devices will require no special device electronics, some will need level converters, while high-speed devices may require bit or character buffers or other special device electronics for interfacing with the BLU.

The dataset 28 represents a data communication channel which operates via long distance lines 29 to connect a remote unit 30 to the BLU and thus to the teller terminal. The dataset 28 requires bidirectional serial data and thus is connected to only one input/output line, cable 22. Generally the dataset 28 requires connection to the voltage interface unit 18. The printer 32 is shown connected to the input/output ports 11 of the BLU via the cable 23. The BLU determines the characters to be printed and controls the printing operation. The printer 32 could be a serial tape printer that requires 12 output leads for transmitting the data information and the print and space controls to the printer 32 and three input leads for servicing the interrupt and completion signals.

The BLU can also control the CRT terminal 34 shown in FIG. 1. This product application is an example of one which requires logic and the voltage interface unit 19 in addition to the BLU. A video signal must be generated for each CRT display. Since the BLU does not have sufficient speed to perform this function, a multi-terminal video generator 36 performs the character generation and refresh memory functions external to the BLU. The multi-terminal video generator 36 is then connected via the cable 24 and the voltage interface unit 19 to the input/output port 11 of the BLU.

The status lights operator display 40 is driven directly by the BLU through the voltage interfacing lamp drivers 20. The keyboard 42 is interfaced directly into the input/output port unit 11 and is capable of transferring eight bits in parallel directly to the BLU. All of the separate peripheral units can use the leads of the input/output port unit 11 in whatever fashion desired, input or output only, bidirectionally, or for data or control information. Each input/output lead into the BLU is programmable, the I/O ports by the controlling program and the individual leads by the internal logic controls.

Referring now to FIG. 2, the basic logic unit (BLU) comprises seven basic functional units. The functional units are: the input/output ports 11, an interrupt address generator 44, an arithmetic and logical unit (ALU) 46, a real time working register 48 and a spare time working register 50, a group of general registers such as an address register 52, a data register 54, and an instruction register 56, a real time indicator register 58 and a spare time indicator register 60, and a real time queue (QR) register 62 and a spare time queue (QS) register 64, a read only memory (ROM) 66, and random access memory (RAM) 68, and last an instruction decoding and execution (IDE) unit 70. A figure number is shown inside each of the blocks. These figure numbers refer to figures or groups of figures which show the internal logic for each of the units. A generalized discussion of the units will be given now with a more detailed explanation given later in the discussion of the particular figure.

All data tranfers between the functions units are made on the eight-bit data bus 10 under the control of the instruction decoding and execution (IDE) logic unit 70. Firmware programs, with variable data stored in the combined ROM/RAM memory, are executed by the BLU to control various peripheral devices through the universal interface feature.

The inputs to the basic logic unit from the peripheral devices are through the input/output port functional unit 11. The input/output or I/O ports 11 accept and present information and control data to the various peripheral devices. In the present embodiment, the I/O ports 11 are hardware modularly added in groups of five.

The I/O ports 11 interface with the data bus 10, transferring eight-bits in parallel. Each of the I/O ports 11 are individually addressed by the program. The I/O ports 11 can be described as a series of eight-bit registers connected to the data bus 10. Each of the registers can be loaded and read as determined by the program stored in the ROM 66. One of the ports is a special interrupt port (port A) and has an interrupt detector on each input to that port. Port A effectively receives and stores the indication from either the peripheral device or the IDE logic that one or more of the peripheral devices requests or requires service. Port B can be program controlled by the IDE logic unit 70 to mask or inhibit any interrupt. A more complete description of the I/O ports 11 will be given in the discussion of FIGS. 3, 3A, and 3B.

The interrupt address generator 44 receives and interprets incoming signals, that is, whether an interrupt has been requested or not, generates a general interrupt signal INT if an interrupt has been requested, and transmits the INT signal to the IDE control logic 70. The interrupt is serviced at the completion of the current spare time instructions. The IDE logic takes the interrupt signal indicating the peripheral device requiring service from the interrupt address generator, produces the correct address for the location in the memory store of the required instruction, transfers the contents of these instructions to the real time program counter, and places the BLU in real time. The memory store, particularly the ROM, must contain the starting memory addresses of the routines which service these interrupts in the same order with which they have been assigned to the interrupt address generator. If two interrupts are awaiting service, the one with the highest priority will be serviced first.

An interrupt may be selectively enabled or committed, or disabled, that is suspended, by the program if an output port lead is connected to the appropriate masked input at the interrupt address generator. An interrupt will be processed by the interrupt address generator if the masked input is in a low state.

Interrupts may be selectively enabled and disabled by assigning an output lead as an interrupt mask. The interrupt can then be disabled by enabling the mask signal corresponding to the interrupt signal. If an interrupt is awaiting service when it is disabled, then that interrupt will be discarded by the interrupt address generator. For example, printer interrupts could be enabled only when the BLU has a message to print. An interrupt enabled by the reception of a start bit from the printer could be disabled during the reception of data and stop bits. Interrupts resulting from the reception of a receive bit would be enabled during reception and disabled during transmision. A more complete description of the interrupt address generator logic unit 44 will be given later in the discussion of FIGS. 4 and 4A.

The arithmetic and logical unit 46 (ALU/SHIFTER) is a combined eight-bit arithmetic unit and eight-bit shifter. The arithmetic operations include logical AND, ADD, exclusive OR (XOR), INCREMENT BY ONE, and ONE COMPLEMENT. The shifting portion of the ALU/SHIFTER is capable of shifting the eight bits up to seven bit positions, right or left, with zero fill or in a circular mode.

The general or working registers comprise five registers specifically called the working registers 48 and 50, the program counter registers 49 and 51, the indicator registers 58 and 60, and the queue registers 62 and 64. These registers include a real time set and a spare time set. In this way, when the machine is operating in spare time and an interrupt occurs, the contents of these registers are saved before starting the real time service. Only the real time registers may be accessed when the basic logic unit is in the real time mode and only the spare time registers may be accessed in the spare time mode.

The working registers are general registers whose content may be shifted right or left, combined logically or arithmetically with data information from the memory store, tested a character or bit basis, used in input-/output operations, transferred to or from, or compared. The contents of the working registers may be added to the memory address word of the instruction to modify the instruction. The result is an effective memory address value used in instruction execution which is variable by modifying the contents of the working register. The working register also has the additional special purpose of masking I/O ports information transfers as described previously.

The program counter registers 49 and 51 control the instruction sequence. The data information stored in the program counter registers is the memory address of the next instruction to be executed. The IDE logic unit 70 transfers the contents of the program counter register, either 49 or 51, to the address register 52, then updates the program counter register information. The indicator registers 58 and 60 store the information reflecting the status of the hardware indicators for interrupt, carry, zero/non-zero, and odd/even.

The real time and spare time queue registers 62 and 64 are used as an internal, variable timing source. These two registers are combined to form a counter which is decremented every microstep time. An interrupt is generated when the counter is equal to zero. The queue registers can be modified to adjust the timing of the next interrupt and thereby modify the pulse width and frequency of data signals received from or transmitted to the terminal devices.

The memory in the basic logic unit comprises the read only memory (ROM) 66 for instructions and constant data, combined with the random access memory (RAM) 68 for variable data. The address register 52 holds the address of the next memory cycle obtained from the data bus. The address register 52 addresses both the random access memory 68 and the read only memory 66. The data register 54 acts as a buffer register between both memory units to the data bus 10. The data register 54 is also capable of taking data information from the data bus 10 and transferring this information into the random access memory 68.

The random access memory 68 is a modular read/-write memory with a nondestruct read cycle. The read only memory 66 is a modular read only memory which is coded with the program instructions used in controlling the operation of the basic logic unit at the time of fabrication.

The instruction decoding and execution (IDE) logic unit 70 functions can be classified in terms of six operations, each one being a sequence of micro-steps. The six micro-steps are stored in a fast access read only memory in the IDE unit 70 and include: an interrupt test, an instruction fetch, an address fetch, a data fetch, an execute, and a data store. The IDE logic unit 70 is the control unit of the machine. The function of the IDE logic unit 70 is to perform the elementary control operations that are necessary to fetch, decode and execute the high-level instructions stored in the combined ROM/RAM memory. This hardware generates "FROM" and "TO" addresses for all other functional units for transfer of data to or from the data processor. In addition, the IDE logic unit generates the ALU/-SHIFTER controls and contains the controlling logic for servicing the interrupts.

An instruction cycle in the IDE unit 70 is as follows: first, an instruction is read by transferring the information in the program counter register to the address register, the program counter is then updated with a new instruction from the ROM; second, the instruction is executed from the instruction register and the data register; third, execution could include one or more of the following — another memory read or a memory write, a transfer to or from any of the registers, a transfer to or from any one of the ports, a shift, add, or logical operation through the arithmetical and logic unit, a modification to the indicator register, or a set or reset of the IDE flags and indicators; and fourth, servicing of the interrupt which may occur at the end of an instruction cycle. The servicing of the interrupt is controlled by the IDE logic, that is, the IDE logic switches to operate with the real time registers, loads the real time program counters, and starts the execution of the appropriate interrupt service routine. The indication of the request for an interrupt is stored in the indicator register.

The logic components utilized in the different components can be discrete component logic circuitry or of the integrated circuit variety. Positive logic circuitry such as AND-gates and OR-gates are used in the description of the preferred embodiment. It is obvious however, that by changing the signal levels, negative and positive logic circuitry can be interchanged without departing from the scope of this invention. As is well-known, positive logic circuitry requires a high signal to activate the circuitry and produces a high signal at the output when activated. In the disclosed embodiment a binary "1" signal is referred to as a high or enabling signal and a binary "0" is referred to as a low or disabled signal.

The AND-gate modules disclosed in the figures provide the logical operation of conjunction for binary "1" or high or positive signals applied thereto. A high level signal appears at the output of the AND-gate when, and only when, all of the input signals applied thereto are in their high state. AND-gates 81 and 82 in FIG. 3*a* are representative of the AND-gates described.

The OR-gate modules disclosed in the drawings provide the logical operation of inclusive OR for binary "1" or high or positive input signals applied thereto. A high signal appears at the output of the OR-gate when any one or more of the input signals are in a high state. OR-gate 117 of FIG. 4 is representative of the OR-gates described.

The inverter modules disclosed in the Figures provide the logical operation of inverting the state of the signal applied to the input of the inverter. Thus a high level signal appears at the output of the inverter when a low level signal is applied to the input. A low level signal appears at the output of the inverter when the input signal is in a high state. Inverter 86 of FIG. 3*a* is representative of the inverters described and shown.

A group of bistable or flip-flops modules comprise the registers of the preferred embodiment. The flip-flop (FF) modules 125 and 126 of FIG. 4 are representative of those used in the system disclosed. The flip-flops shown can be standard J–K flip-flops requiring a high signal applied to both the set and clock triggering inputs of the flip-flop before the flip-flop will change from the reset stage, that is, the "0" output is high or enabled, to a set state, that is, the "1" output is high or enabled. Generally, the clock pulse triggers the change in state of the flip-flop when the clock pulse changes state upon its low to high transition.

INPUT/OUTPUT PORTS

Figure 3:
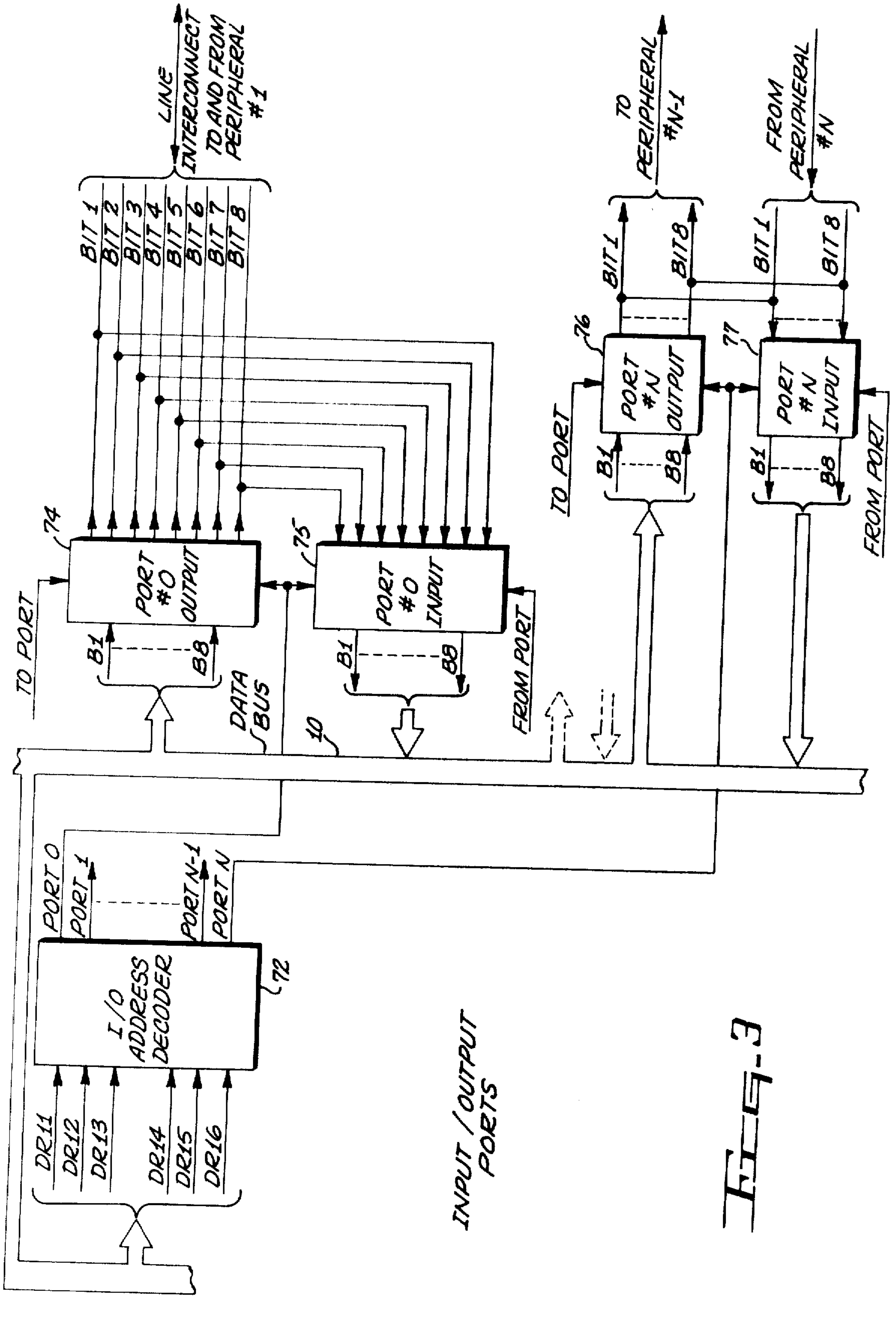
FIG. 3 is a block diagram of the input/output port unit shown in FIG. 2.
Figure 3A:
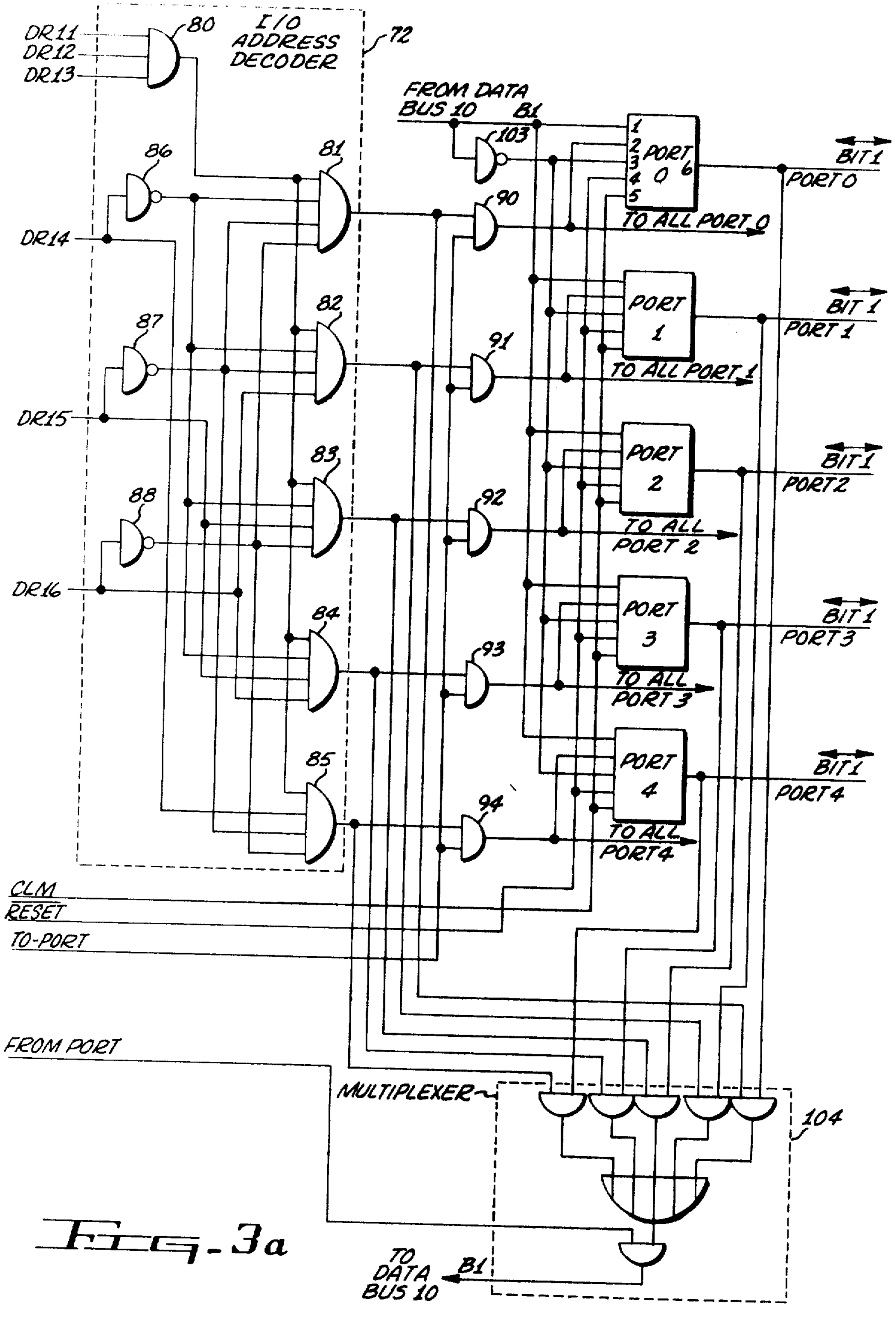

A block diagram of the input/output port unit according to the present invention is shown in FIG. 3. A logic diagram for a portion of the input/output port unit is shown in FIG. 3*a*. For a complete description of the universal interface feature of the basic logic unit, references is made to a copending application, Ser. No. 329,491, filed on Feb. 5, 1973, entitled UNIVERSAL INTERFACE SYSTEM USING THE CONTROLLER TO ADAPT TO ANY CONNECTING PERIPHERAL DEVICE, and assigned to the same assignee as the present invention.

Referring now to FIG. 3, the I/O ports comprise an I/O address decoder 72 for activating a particular port, an output unit 74 and 76 in each port for controlling the transfer of data information to the peripherals, and an input unit 75 and 77 in each port for controlling the inputting of data information from the peripherals to the basic logic unit. Two ports, port No. 0 and port No. N are shown on FIG. 3 representing than any number of I/O ports can be attached to the basic logic unit, depending only on the addressing signals used to activate a particular port.

The address selection according to the preferred embodiment is taken from the data registers, DR11 through DR16 in particular. Two instructions, input INP and output OUT, are used to activate the I/O ports. These instructions are obtained from the read only memory 66, transferred to the data register 54, and then, via the data bus 10, directed to the I/O ports 11, (see FIG. 2). The address decoder 72 takes the information from these data register inputs and activates a particular port. The data register inputs are shown as DR11–DR16 signals to show the origination but these inputs are bit information signals B1–B8 from the data bus 10 as are any signal removed from or placed on the data bus.

To transmit information from a particular port, the data information is transmitted from the memory store, either the RAM or the ROM, to the data register and via the data bus to the output unit as bit information signals B1–B8. Thus if port No. 0 is activated, the data information, B1 to B8 is transmitted from the data bus into registers located within the port 0 output unit 74. The "TO PORT" signal is then activated by the instruction decoding and execution (IDE) logic and the data information is transmitted from the port No. 0 output unit 74 to become the bit 1 to bit 8 signals transmitted to peripheral No. 1.

As shown in FIG. 3, the ports may be connected in any one of several different formats. For instance, port 0 input unit 75 and output unit 74 are connected together such that data information can be transmitted to an from the peripheral No. 1. Port N, however, has its output unit 76 connected to peripheral No. N minus one and its input unit 77 connected to a different peripheral, peripheral No. N. Port 0 could be connected to the CRT unit 34 shown on FIG. 1, for example, and port N output could be connected to the status lights display unit 40 with port N input connected to the keyboard unit 42. The basic logic unit may have all output leads and no inputs or all inputs and no outputs or any combination in between. Several ports may also be connected to one peripheral if necessary in order to implement the transfer of data to a particular peripheral device. For instance, a card reader requires twelve parallel input data lines and thus the leads from two ports could be used to cover all of the data and control leads. Thus the basic logic unit is very flexible depending only on the programs stored in the memory units.

To continue with the operation of port No. 0, if data information is to be transmitted from peripheral 1 into the basic logic unit, the data information, bits B1 through B8 are transmitted into the port No. 0 input unit 75. The "FROM PORT" signal is then activated by the IDE control unit and the data information from the port No. 0 input unit 75, B1–B8, is then directed to the data bus 10 into one of the registers, depending upon the register selected by the IDE logic unit. It is, of course, obvious that the address decoder 72 must have activated the port 0 via the data register DR signals in order to allow the transfer of data information from the peripheral onto the data bus 10.

FIG. 3*a* shows the schematic for the input/output port. The input/output ports are modularly added to the basic logic unit in, according to the present invention, groups of five. The I/O ports interface with the data bus, 8 bits in parallel. Each of the ports can be individually addressed by the program instructions stored in ROM and can load data from or read data information to the data bus. The I/O ports can be thought of as a series of 8-bit registers connected to the data bus. These port registers could be used as additional storage registers if the application warrants.

At the device or output side of the ports, the side that interfaces with the device electronics, the I/O ports appear as an interface with individual I/O leads. Each of these individual leads can be used as either an input or an output, as determined by the firmware program which activates the port, to either take the information from the I/O leads or to load information into a selected port to transfer information to the I/O lead.

In FIG. 3*a*, a portion of the logic for the input/output ports 11 is shown. In this circuitry the address decoder 72 is controlling five ports, port 0 to port 4, for the transfer of one bit of information, bit 1. Thus for the five ports shown, each port has seven similar circuits to accomplish the transfer of all eight bits to and from the peripheral unit. Likewise if more than five ports are to be needed, another complete section can be added using a different combination of the data register signals, DR11–DR16, to accomplish the activation of the different ports. The decoder therefore as shown in FIG. 3 can be used to drive many more ports.

The data register signals decoded by the logic AND-gates 80-85 and the inverters 86, 87 and 88 in the I/O address decoder 72 activate the entry of data information into ports 0–4. The decoded address signals from the address decoder 72 are directed to AND-gates 90–94, each of whose other input is controlled by the TO-PORT signal. When the TO-PORT signal is activated by the IDE logic, the port selected by the address signals will be activated to store the B1 information bit via the B1 and $\overline{B1}$ signal directed to the ports through the data bus 10 and an inverter 103, respectively. Each of the port circuitry blocks 95–99 shown in FIG. 3A include logic circuitry, see FIG. 3B, comprising two AND-gates 100 and 101 and a flip-flop 102. The input numbers shown in port 0 of FIG. 3A correspond to the same input numbers shown in FIG. 3B.

The leads connected to the peripherals are bidirectional leads. The data information can be transmitted out to the peripheral as just described or the data information from the peripheral can be directed into the port via the same lead. Incoming data information is transmitted along the port 0 bit 1 lead into the I/O ports and on into a multiplexer circuit 104 shown at the bottom of FIG. 3A. The multiplexer circuit 104 accomplishes the transfer of a group of incoming bit information for the transfer of one B1 data information signal to the data bus 10. The multiplexer circuit 104 is the logic circuit that performs the transfer and is represented in FIG. 3 by the bus lines running to and from the port signals. The multiplexer 104 shown in FIG. 4 could accept the bit 1 data information signal from five separate peripheral units or less depending upon the interconnection between the I/O port of the basic logic unit and the peripheral unit. The multiplexer is activated by the respective port address signal from the address decoder 72. Thus when the FROM PORT signal is activated, the information bit signal coming in from the selected port is transmitted into the basic logic unit on the data bus 10. The B1 information signal labeled as being from the data bus 10 directed to the input to the port circuits and the B1 information signal labeled as being directed to the data bus 10 from the multiplexer 104 is the same lead. The designations were placed in separate locations for ease of explanation only.

One port cannot accept input data at the same time the port is transmitting data. However, by activating the multiplexer 104 while the data information is being transmitted, the logic circuitry shown could be used as a wrap-around checking feature to check the data being transmitted to the peripheral devices.

INTERRUPT ADDRESS GENERATOR

The interrupt address generator logic 44 according to the present embodiment and partly shown in FIG. 4 accepts up to sixteen interrupt input signals and detects and stores for each input the fact that an interrupt signal has occurred. At the time of the occurrence of any interrupt input signal, I1–I8, the interrupt address generator logic 44 via a priority encoder 115 transmits a general interrupt signal to the IDE logic unit 70. The IDE logic unit generates a unique "FROM ADDRESS" FA1–4 signal for transmission to the interrupt address generator 44. The FA1–4 signals are shown directed to an address decoder network 116. The address decoder network 116 accepts the proper FA1–4 signals and activates, that is, releases the inhibiting of, the priority encoder 115 logic circuitry.

Figure 4A:
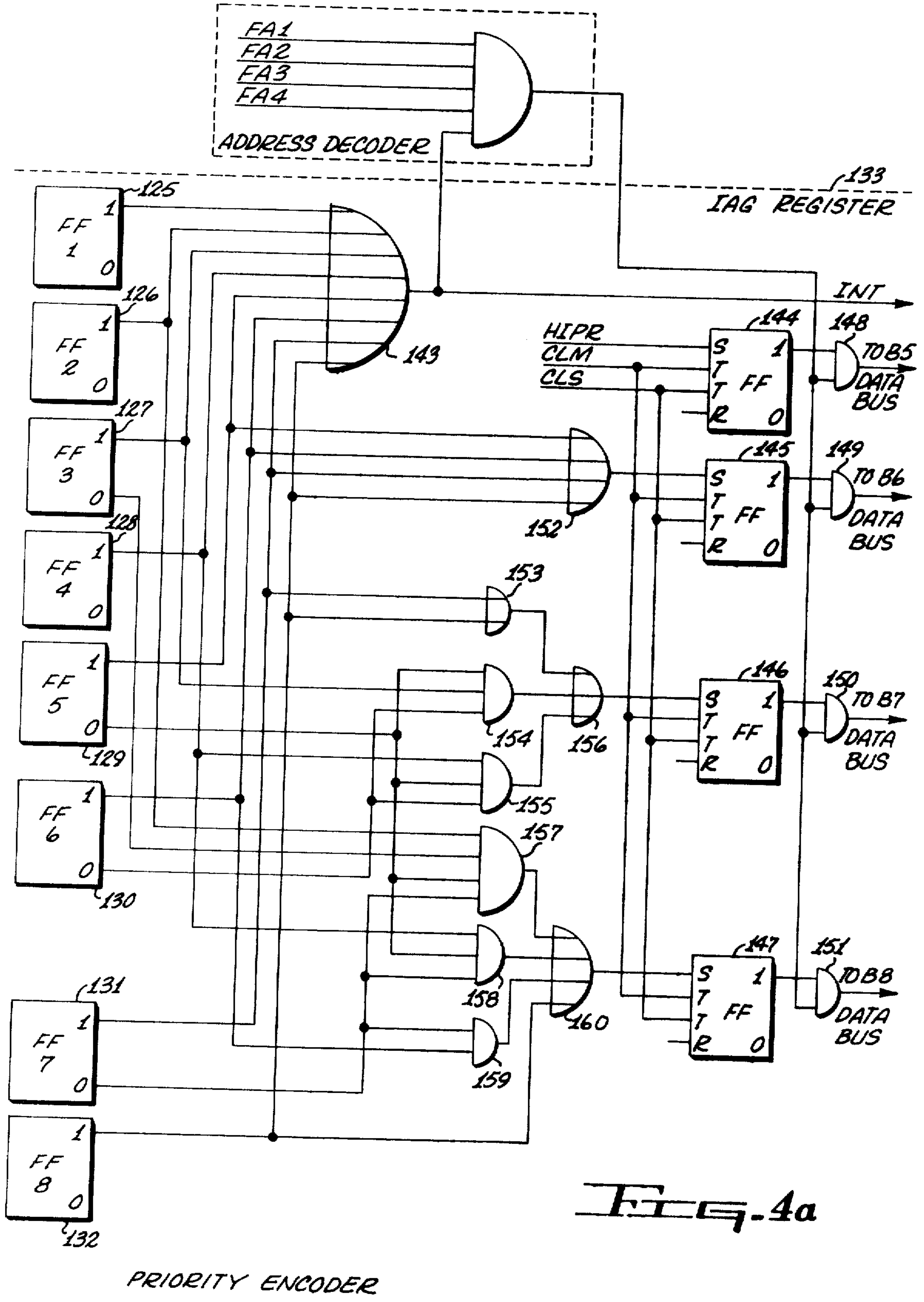

The interrupt address generator 44 via the priority encoder 115 generates an interrupt address value to the data bus corresponding to the interrupt that occurred and is the next interrupt to be serviced. In the embodiment being described, service to a peripheral is according to a preselected rank. Some peripherals require immediate service and thus have a high rank, while others can wait or are controlled via the I/O port and thus data is not transmitted until requested. The priority encoder selects the peripheral to be serviced according to the preselected rank. A logic circuit for use in the priority encoder is shown in FIG. 4a.

Four data bits B5–B8, are shown generated by the priority encoder 115. A similar circuitry to that shown in FIGS. 4 and 4*a* develops the data bits B1–B4 for transmission to the data bus line. The interrupt address value generated by the priority encoder 115 at its output is used by the IDE logic unit as a portion of a memory address corresponding to the first sixteen locations of the last word page of memory store. These sixteen words contain the starting addresses of the real time routine which service the 16 possible interupts. The IDE logic unit then uses the interrupt address value to read the corresponding memory location, transfer the content of that word to the real time program counter, and places the BLU in the real time mode for execution of the indicated real time program.

An interrupt condition is serviced at the completion of the current spare time instruction or after an interrupt return (IRT) instruction is executed in real time. The IDE control logic uses the interrupt address value to read the corresponding memory location, transfers the content of that word to the real time program counter, and places the basic logic unit in the real time mode for execution of the indicated real time program. If more than one interrupt is awaiting service, then the one assigned the highest value 0 to 15 will be serviced first, independent of the order in which the interrupts occur.

Still referring to the logic circuitry for the interrupt address generator 44 of FIG. 4, the interrupt signals I1–I8 are detected by a group of detectors 134–141 and stored in a correspnding flip-flop 125–132 of an interrupt address generator register, IAG register 133.

The interrupt address generator 44 has additional inputs called mask signals M1–M8 which are used to disable interrupt inputs received from specific peripheral devices. Interrupt signals may be selectively enabled or disabled by connecting one of the I/O leads to the interrupt mask inputs. On FIG. 4 the masking signals, M1–M8, are shown directed to one input to a group of OR-gates 117–124 in the IAG register 133. The output of the OR-gates 117–124 is directed to the reset or disabling input to the flip-flops 125–132 comprising the IAG register 133. Thus if an interrupt signal I1 is received at the input to the detector 134, the flip-flop 125 connected to the output of the detector 134 is then enabled. The interrupt can then be enabled or disabled by controlling the output level of the M1 lead via the OR-gate 117. If an interrupt is awaiting service when it is disabled, that interrupt will be discarded by the interrupt address generator 44. For example, printer interrupts may be enabled only when the BLU has a message to print. The printer interrupt will be disabled if there is no message to be printed or when the printer is not ready to receive a message, thereby preventing interrupts from unnecessarily slowing machine operation.

Referring now to FIG. 4*a*, the priority encoder 115 selects the highest valued interrupt of these eight interrupts and generates an address using the bit information signals B5–B8 encoded according to the highest interrupt received by the interrupt address generator 44. The other eight interrupts for a total of 16 possible interrupt signals are generated by a corresponding interrupt address generator exactly the same as the disclosed circuit. The corresponding interrupt address generator generates the address signals for the B1–B4 bit information signals to the data bus. The interrupt signal inputs to the corresponding interrupt address generator have a higher priority than the one shown since in the embodiment being described, the higher the interrupt number, the higher the priority rating. The H1PR signal is enabled if an interrupt is stored in the corresponding interrupt address generator. The H1PR signal effectively disables all interrupts from the priority encoder shown in FIG. 7. The B1–B4 and B5–B8 data information signals are transmitted to the IDE logic via the data bus for the generation of the complete program instruction to control the input/output ports.

The set or "1" outputs of the flip-flops 125–132 of the IAG register 133 are directed to an OR-gate 143. The OR-gate 143 generates a general interrupt signals INT when any one or more interrupt signals are received by the interrupt address generator. The set and reset outputs of the flip-flops 125–132 are selectively applied to a series of logic gates 152 to 160, both AND and OR gates, which comprise the priority selection. Priority selection systems are well known in the art and thus the logic circuit shown is merely exemplary of systems that could be used.

The flip-flops 125–132 along with the logic gates 152–160 and the H1PR signal from the higher priority unit control the activation of output flip-flops 144–147 to generate the particular part of the address signals, B5–B8, transmitted to the IDE unit. The interrupt signals stored in the IAG register flip-flops 125–132 determine the state of the B5–B8 signals transmitted to the data bus.

The outputs of the flip-flops 144–147 are directed to a group of AND-gates 148–151 which have one leg of each controlled by an AND-gate 142 in the address decoder 116. The outputs of the AND-gates 148–151 are directed to the B5–B8 data lines respectively in the data bus. The signals representing the interrupt having the highest priority are transmitted to the data bus upon the activation of the AND-gate 142 of the address decoder 116 by the FA1–FA4 signals generated by the IDE logic in response to the INT signal.

After the address of the highest priority interrupt signal has been serviced, that interrupt signal is then cancelled. The interrupt signal is cancelled by resetting the particular flip-flop in the IAG register 133 storing the interrupt signal. Referring to FIG. 4, the address signals B5-B8 are directed to a decoder network 161 having its outputs directed to the OR-gates 117–129 connected to the reset input of the IAG register flip-flops 125–132. The decoder is a standard binary four input-to-ten output circuit of which eight outputs are used. The IDE logic services the interrupt by generating the interrupt address value corresponding to the I/O port that is to be activated. This interrupt address value is sensed by the decoder network. The decoder network in turn transmits a signal to reset the IAG register flip-flop storing the interrupt request being serviced via one of the OR-gates 117–129.

ARITHMETIC LOGIC UNIT/SHIFTER

The arithmetic and logical and shifter unit, ALU/-SHIFTER, according to the preferred embodiment and shown in FIG. 5 is a combined 8-bit arithmetic unit and 8-bit shifter. The ALU/SHIFTER is divided into two identical 4-bit sections. In the present embodiment, the B1 bit information signal from the data bus 10 is designated the most significant digit. One ALU/SHIFTER section controls the more significant data bits B1–B4 and directs these bits to the data bus 10. The second ALU/SHIFTER section controls the lesser significant data bits B5–B8 and directs these bits to the data bus. The logical circuitry in each unit is designed such that the logical units can be used alone for a 4-bit unit or used in combination for an 8-bit unit. Since the units are identical, a discussion of the circuitry in both is not believed to be necessary. Therefore, in FIGS. 5*a*, 5*b* and 5*c* only one unit is shown. The control circuit is the same for both units. The only difference is the connection to and from the data bus. The first or most significant half unit will be described in the following figures. The data bus connections for the second unit are shown in parenthesis on the data bus signal connections.

Referring now to FIG. 5, a block diagram of the first arithmetic logic unit and shifter is shown. The ALU/-SHIFTER comprises an arithmetic section and a shifting section with the output combined in a multiplexer 200. The multiplexer 200 provides a shift by one if activated by the shift selection unit 206 and derives the data bus information signals, B1–B4, for connection to the data bus 10 under control of an address decoder 210. The arithmetic section includes an arithmetic selection unit 201, an input register 202, an arithmetic gating unit 203, a full adder unit 204, and the register output 205. The shift section includes a shift selection unit 206, a shift by four unit 207, a shift by two unit 208, and a register shift output 209. As stated, the shift by one is provided in the multiplexer unit 200.

The arithmetic selection unit 201 takes the arithmetic commands from the instruction decoding unit (FIG. 10) and selects the arithmetic operation to be performed. The information bits from the data bus are transmitted to and stored in the input register 202 upon the activation of an allow input AIN signal directed to the input register 202 from the arithmetic selection unit 201. At the same time, the arithmetic selection unit 201 selects the correct arithmetic gating controls to perform the required function. For instance, in an add instruction, the C1 and C2 signals shown at the output are enabled. The COMP signal is enabled if a complement of the number is desired and the INC signal is enabled if an increment by 1 is desired. The INC signal is permanently placed in a low state on the most significant half section if both four-bit sections are used to make an 8-bit unit. The INC signal adds "1" to the least significant digit only. If the C1 and C2 signals are both disabled, a logical AND function will be performed by the arithmetic section. If only the C2 signal is enabled, an exclusive OR logical function will be performed. The C1 signal only enables the carry signal COUT. General operation of the arithmetic section on an add function is to gate the first data information from the data bus into the input register 202 on the first clock timing pulse. The first information is then gated to the output register 205 and the information to be added to the first data information is gated into the input register 202. The information in the two registers is then combined via the full adder unit 204 and the result is placed into the output register 205. Logic is provided for a full carry look ahead including a carry out signal for reflow or for signifying a carry to the higher or more significant digit section.

The shift section is capable of shifting in a bidirectional mode either right or left by performing selected shifts with zero fill or in a circular mode. The shift section according to the preferred embodiment can shift 8 bits of information a miximum of 7 shifts by selectively activating the shift by four unit 207, the shift by two unit 208, and the shift by one capability of the multiplexer 200. A shift command from the IDE unit (FIG. 10) activates the shift selection unit 206 according to the required shifting instructions. The shift selection unit 206 activates any one or all of the three shifting units via a shift selection signal, a N1 signal for the shift by four unit 207, a N2 signal for the shift by two unit 208, and a N3 signal for the shift by one section of the multiplexer 200. The data information bits B1–B8 from the data bus are transmitted into the shift by four unit 207 first and transmitted through the shift by four unit 207 into the shift by two unit 208 and then into the register shift output 209. The path is taken whether the shift by four or the shift by two units are activated or not. The direction signals, right or left (R and L), control only the shift by four unit 207. If a right or left shift is required either the R or L signal is activated. For a circular mode both the right and the left direction signals are activated. Since the first four bits of information B1–B4 are designated the most significant digits, the MSH signal is activated and controls the shift selection unit 206.

The shifted data information in the register shift output 209 is directed to the shift by one section of the multiplexer 200. The shift by one section of the multiplexer 200 is activated by the shift selection signal N3. The multiplexer 200 will perform a shift by one operation if activated by the N3 signal. If there is no shift by one required, the multiplexer 200 will transmit the data information from the register shift output 209 without change to the data bus 10. The information stored in the multiplexer 200 either from the shift section or from the arithmetic section is transmitted to the data bus upon the activation of an allow output AOUT signal and selected FROM address FA1–FA4 signals directed to the address decoder 210 from the instruction decode and execution unit 70.

Figures 3B, 5D:
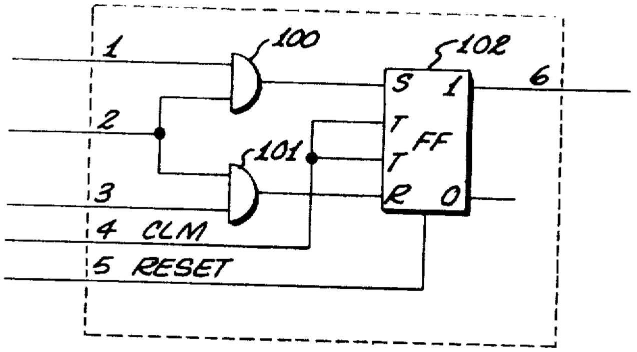
Figure 5A:
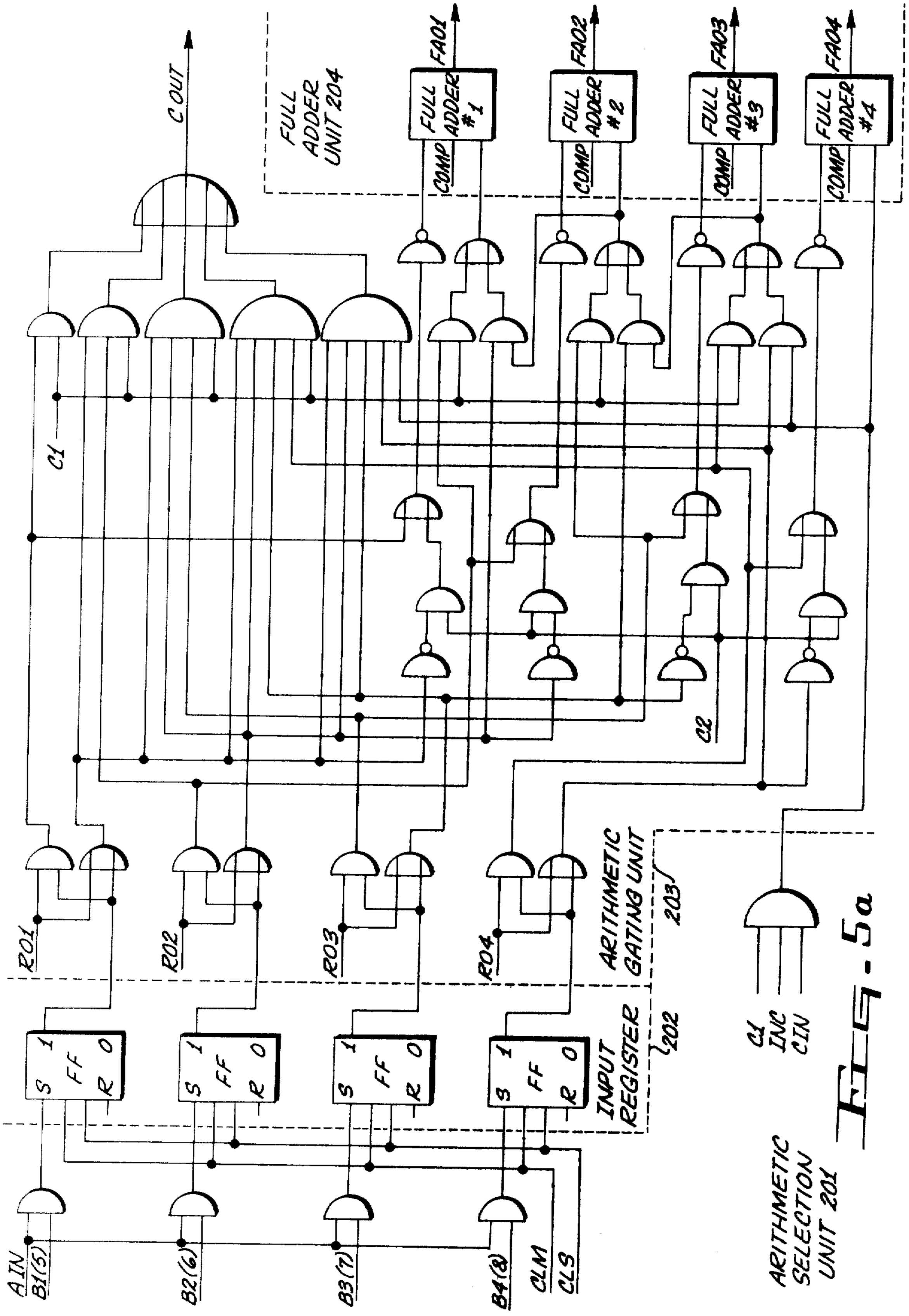
Figure 5B:
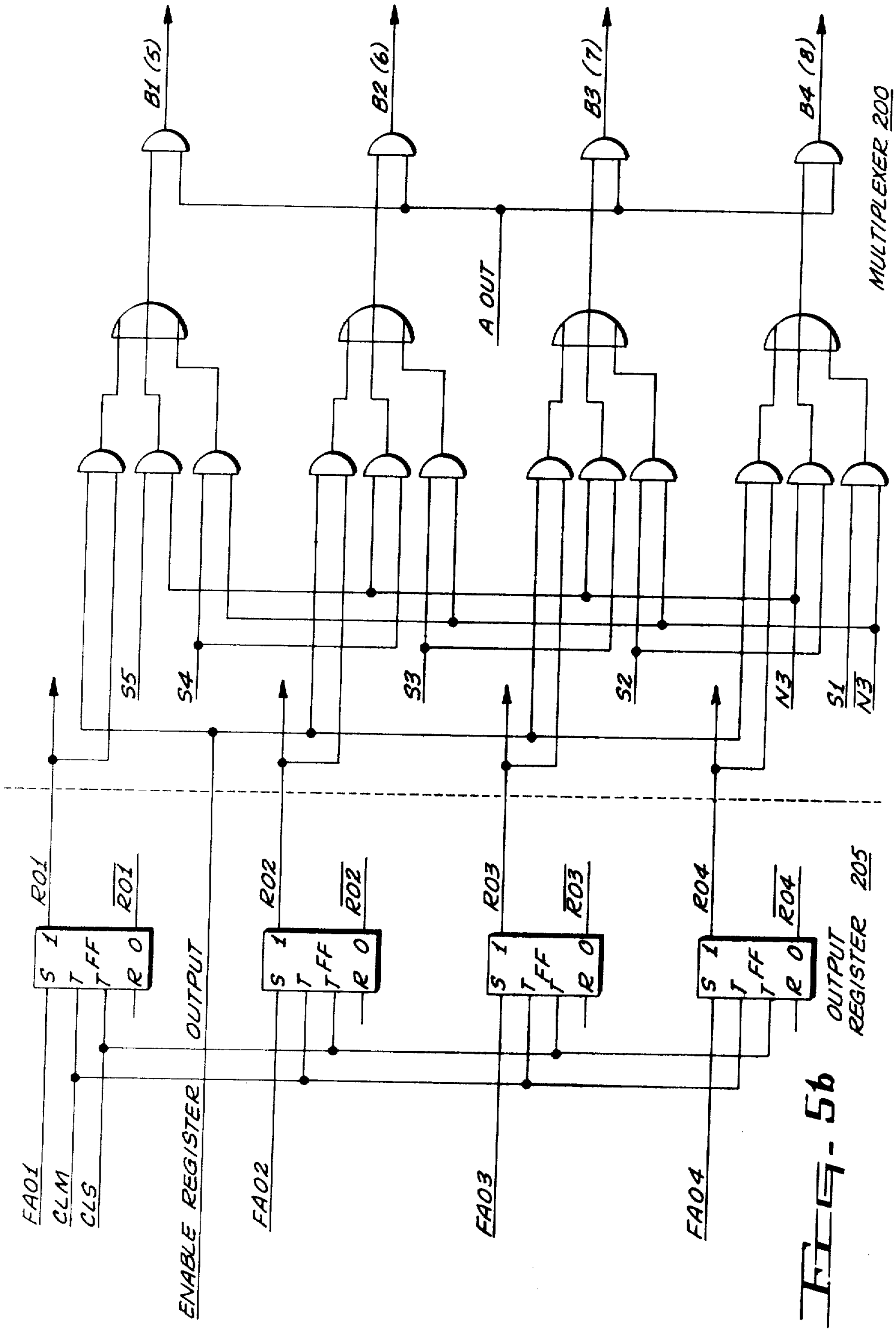
Figure 5C:
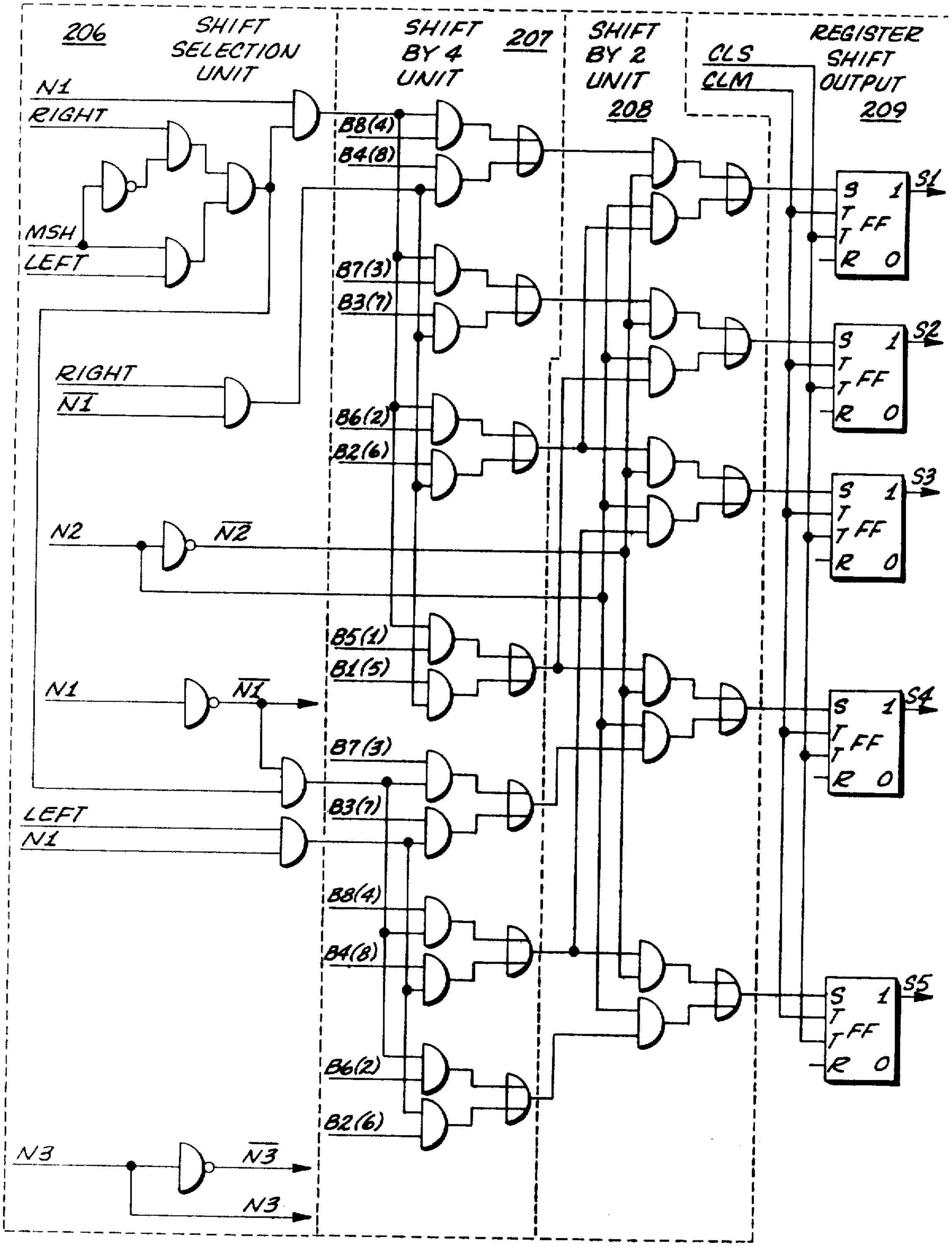

The particular logic configuration for the most significant half of the ALU/SHIFTER shown in FIG. 5 is shown in FIGS. 5*a*, 5*b* and 5*c*. The logic configuration for the arithmetic selection unit 201, the input register 202, the arithmetic gating unit 203, and the full adder unit 204 is shown in FIG. 5*a*. The logic configuration for the output register 205 and the multiplexer 200 is shown in FIG. 5*b*. The logic configuration for the shift section and comprising the shift selection unit 206, the shift by four unit 207, the shift by two unit 208 and the register shift output 209 is shown in FIG. 5*c*. A truth table for the shift section for use with the eight bits of information according to the preferred embodiment is shown in FIG. 5d.

Referring now to FIG. 5*a*, the allow input AIN signal controls the loading of the input register 202 with the data information signals B1–B4 from the data bus. The data bus connections for the least significant section is shown in parenthesis after the data information signals. When the AIN signal is high or enabled, the information from the data bus is transferred into the input register. The actual transfer is made when the master clock signal CLM changes state from a low to a high signal level. The input register is cleared to all zeros, that is, to a reset state, if the AIN signal is low and a master clock CLM signal and slave clock CLS signal activates the flip-flops in the input register. The master clock CLM signal is used to synchronize the data information transfer through the basic units. The slave clock CLS signal is a delayed timing signal controlling the resetting of storage registers.

The output signals from the input register are directed to logic gates in the arithmetic gating unit 203 to combine the information bit signals stored in the input register 202 and the output register RO1–RO4 signals and to generate a carry to the next more significant bit position. The COUT output signal from the unit servicing the least significant bits will become the carry in CIN input on the unit servicing the most significant digits. The COUT signal on the unit servicing the most significant digits is used to indicate a carry out or an overflow of the most significant bit of the arithmetic section.

The logic gates in the arithmetic gating unit 203 are selectively directed to the inputs to the full adder units. The full adders disclosed herein provide an enabled output if an odd number of the three inputs to the adder are enabled. An input to the full adders is controlled by the COMP signal to enable the complementing of the binary information bits. Full adder No. 4 is activated by the carry in signal from the least significant section. The increment by one INC signal is permanently disabled on this section since the INC signal affects only the least significant digit. The carry-in CIN signal affects the carry logic units of the arithmetic gating unit 203 and the full adder No. 4 if the carry out signal from the lesser significant arithmetic section is activated.

The outputs of the full adder unit, the FA01–FA04 signals, are directed to the output register. Thus upon the occurrence of the CLM clock signal, the output register will contain the information from the full adder unit. The output signals, RO1–RO4, of the output register are directed to the multiplexer and to the arithmetic gating unit (see FIG. 3). The multiplexer 200 is enabled by an enable register output signal. The enable register output signal is generated by the FROM address signals directed to the address decoder 210 and allows the transfer of the signals from the output register to the multiplexer 200. The actual transfer to the data bus occurs when the allow output AOUT signal is enabled.

The multiplexer 200 also includes logic gates used in the shift section to provide the shift by one capability of the multiplexer 200.

In the operation of the arithmetic and logical section and referring to FIGS. *5a* and *5b*, the input register 202 will be cleared to all zeros upon the occurrence of a CLS clock signal provided the AIN signal is low disabling the transfer of the bit information signals into the input register 202. With the input register 202 cleared, the output register 205 can be cleared to all zeros on a CLS clock pulse if the control signals in the arithmetic selection unit 201 are set for an "AND" operation, that is, C1=0, C2=0, COMP=1, INC=0. The logical AND function of all zeros with any value is still all zeros. With the input register 202 cleared, the information stored in the output register 205 can be recirculated through the arithmetic gating unit 203 unchanged if the signals controlling the ALU/SHIFTER are set for either an ADD or an exclusive OR operation, that is, C1=1, C2=1, COMP=0, INC=0, or C1=0, C2=1, COMP=0, INC=0. The ADD or exclusive OR operation of all zeros with any value is that value. Thus the results of any operation can be stored in the output register.

With the output register 205 cleared, the first of two operands can be transferred into the output register 205 from the input register 202. The arithmetic selection signals must be set either in the ADD or the exclusive OR operation. The first operand information can be "1's complemented" as it passes through the arithmetic gating unit 203 and the full adder unit 204 by setting the COMP signal to a high state. The second operand is then transferred into the input register 202 on the same clock signal which transfers the first operand to the output register 205. The second operand is transferred into the input register 202 from the data bus 10 by enabling the AIN signal.

To perform a logical AND operation, the C1 and C2 signals are low, that is, C1 and C2=0, and the COMP signal is high, that is, COMP=1. The signals from the input register 202 and the signals from the output register 205 are combined in the arithmetic gating unit 203. With both the C1 and C2 signals disabled, no carry functions can be performed. Assuming that both the A1 and RO1 signals are high, that is, A1 and RO1=1, the signal applied to the full adder No. 1 will be low. The COMP signal being enabled will permit a 1 or enabled signal to be generated by the full adder No. 1 and this information will be stored in the output register. The third input to the full adder No. 1 is disabled by the low C1 and C2 signal. Thus a logical AND function is performed. A logical NAND function is performed if the COMP signal is set to a low state. The exclusive OR function can be performed by enabling the C2 signal and following the path as previously described. Likewise the ADD function can be performed by enabling the C1 and C2 signals to enable the full carry function of the arithmetic gating unit 203.

An "inclusive OR" function can be accomplished by the arithmetic section of the disclosed embodiment by multiple operations. The first operation is to complement both operands, then performing the logical AND functions on the complemented values, and then complementing the results. That is, by DeMorgan's theorem, $(A1+RO1)=(\overline{\overline{A1}\cdot\overline{RO1}})$.

Referring now to FIG. *5c*, the logic components of the shift section of FIG. 2 are shown. The separate blocks shown in FIG. 5 are separated by dashed lines in FIG. *5c*. The shift selection unit 206 comprises a plurality of logic components which take the direction signals, right and left, and the shift selection signals, N1, N3 and N3, from the instruction decode and control the operation of the three shift units used in the preferred embodiment. The half section being described is the most significant half of the ALU/SHIFTER since this section controls the most significant digits, the B1–B4 information signals. Therefore, the MSH signal is enabled. The use of the MSH signal permits the use of identical logic circuitry for each half section of the position scaler section when two units are used for eight bits of information. The MSH signal selectively activates the correct logical gates in the shift by four unit 207 to accomplish the bidirectional shift in the circular mode. The MSH signal is directed to logic components to permit a left shift only for certain of the information bits if the section is the most significant half and to permit a right shift only to the same information bits for the most significant half section.

The logic gates in the shift by four unit are controlled by the direction signals, R and L, and the N1 shift by four selection signal selectively combined in the shfit selection unit 206 and applied to the shift by four unit 207. Both the true N2 signal and its inverted signal $\overline{N2}$ control the shift by two unit 208. The shift by 1 N3 and $\overline{N3}$ signals are directed to the shift by one section of the multiplexer 200, see FIG. *5b*.

The number of logic gates in each of the shifting units and the control of each logic gate of the shifting units by the shift selection unit 206 can be obtained by referring to a copending application, Ser. No. 329,805, filed on Feb. 5, 1973, and entitled "IMPROVED POSITION SCALER FOR COMPUTER ARITHMETIC UNIT," which application is assigned to the same assignee as the present application. Details of the shift section can be obtained by referring to the aforementioned copending application. The position scaler according to the ALU/SHIFTER of the present invention is basically two four-bit shifters combined through selective actuation of the shift selection unit.

Thus the shift by four unit 207 comprises a plurality of AND-gates, 14 in number, and a plurality of OR-gates, 7 in number. The shift by two unit 208 comprises a plurality of AND-gates, 10 in number, and a plurality of OR-gates, 5 in number. The outputs from the shift by two unit 208 are directed to the register shift output unit 209 for storage before presenting the signals to the multiplexer 200. The register shift output unit 209 permits the use of a common data bus to direct the signals to the shift unit and then to transmit the shift resultant back via the multiplexer to the data bus. The register shift output signals S1–S5 are directed to the multiplexer 200, see FIG. *5b*.

For an operation the truth table of FIG. *5d* should be consulted for the signals activated by the IDE logic unit 70. For instance, referring to the truth table of FIG. *5d*, for a shift right of two positions, R2 in the operation column, the right signal has been enabled, R=1, the left signal is disabled, L=0, the N1 and N3 shift selection signals are disabled, N1 and N3=0, and the N2 shift selection is enabled for the two position shift, N2=1. Thus for a right two, R2 shift command, the B1 and B2 signals will be low since no information bits can be shifted right into these positions. This is shown by the dash in the B1 and B2 columns for a R2 shift. The B1 input information bit can then be traced through the logic gating for eventual positioning in the B3 information bit position on the output. As stated previously the bit information signals B1–B8 directed to this half of the ALU/SHIFTER unit are shown first on the group of AND-gates in the shift by four unit. The numbers shown in parenthesis immediately after the bit information signals refer to the bit information signal that is directed to the second ALU/SHIFTER, the least significant half section. Since an 8-bit shifter is the preferred embodiment, both halves should be checked.

The shift left is performed in a similar manner as the shift right except that the shift is performed in the opposite direction, from the least significant digit B8 towards the most significant digit B1. For a shift left requirement, the right or R signal is low, R=0, the left or L signal is enabled, L=1, and the shift selection signals, N1, N2 and N3 are enabled selectively according to the truth table shown in FIG. 5*d*. Thus for a shift left of two, referring to FIG. 5*d*, for an L2 operation the N1 and N2 signals are high, N1 and N2=1, and the N3 shift selection signal is low, N3=0. Using the truth table and the logic as shown in FIG. 3, a left shift can be followed through the separate units.

A somewhat different operation is performed in the circular mode as shown in the truth table of FIG. 5*d*. For instance, if a two shifts in the right direction or six shifts in the left direction is performed in the circular mode, the information bit signals eventually end in the same position. Thus in FIG. 5*d*, these operations are shown on the same line. In the circular mode, following the operation of a right two or left six R2L6 operation, the right signal R is high, R=1, the left signal L is high, L=1, the N1 and N3 shift signals are disabled, N1 and N3=0, and the N2 shift signal is high, N2=1. The B7 information bit signal on the input should, according to the truth table, become the B1 bit information signal at the output.

SPECIAL REGISTERS

The special registers shown in FIG. 6 are the individual registers performing special purposes in the controller or basic logic unit. The special registers are shown as blocks in the block diagram of FIG. 6. Registers are well-known in the art and therefore it is not believed to be necessary to show exact circuitry in describing the use of the special registers to show the signal interconnection of the entire data processing system according to the present invention.

The special registers are five in number each separated into two 8-bit sections, each receiving data information signals B1–B8 from the data bus 10. The five special registers are: address registers 52A and 52B, data registers 54A and 54B, instruction registers 56A and 56B, real and spare time indicator registers 58 and 60 and real and spare time queue registers 62 and 64. The TO address TA1–TA5 signals from the IDE logic unit 70 control a select-register-to-be-loaded decoder 53 and thus select the register that is to store the data information from the data bus or from the main memory store in the case of the DR data register 54. The FROM address FA1–FA5 signals from the IDE logic unit 70 control a select-register-to-be-unloaded decoder 55. The output signals from the select-register-to-be-unloaded decoder 55 control a multiplexer unit 57. The multiplexer unit 57 transfers the data information from the half section of the register selected according to the FROM address signals, to the data bus 10. The FROM address signals do not control the transfer of the memory address signals stored in the AR address register 52 to the memory store.

Referring to FIGS. 2 and 6, the AR or address register 52 controls the addressing of the memory store, both the random access memory (RAM) and the read only memory. The address register 52 stores the information from the data bus and activates the memory units via the ARO1–AR16 signals. The data information from the main memory unit is then transmitted to the data register 54 via the MEMO1–MEM16 signals shown directed to OR-gates 59 and 61 at the input of the DR data register 54. The OR-gates are symbolic of the logic required to transfer data information to all of the storage units of the data registers either fraom the data bus or from the main memory outputs.

The data register 54 is used either as an interim message store to hold data information from the memory store or from the data bus, or as a register to store the instruction retrieved from the read only memory for activation of the instruction decoding and execution IDE logic unit 70. The outputs from the data registers are transmitted directly to the IDE logic unit 70 or onto the data bus 10 via the multiplexer 57 under the control of the FROM address signals.

The IR or instruction register 56 can also be used either as an interim register to store data information received from the data bus for later return to the data bus or to store instructions for activation of the instruction decoding and execution IDE unit 70. The instruction register 56 receives the information from the data bus either from the peripherals via the input/output ports 11 or from the read only memory 66 via the data register 54. The instruction register 56 stores the data information signals which directs the IDE logic unit 70 to control the operation of the entire basic logic unit. All control instructions of the basic logic unit are stored before execution in the instruction register.

The IND indicator registers comprise two separate eight-bit sections, one called the real time indicator register 58 and the other the spare time indicator register 60. The indicator register is basically two eight-bit registers rather than one sixteen-bit register as discussed for the previous three registers. The register that is selected depends upon whether the basic logic unit is operating in real time or spare time. The indicator registers, both real and spare time, indicate whether or not there is an interrupt, whether there is a carry indication or not, whether the information is a zero or a nonzero, and whether the number is odd or even. In the embodiment being described, the odd number register bits IND1, IND3, IND5 and IND7 indicate the interrupt, carry, zero indication and odd/even indication, respectively. The even number bits of the indicator registers can be used as flags to indicate a particular happening in the basic logic unit. The extraction of the data information from the indicator registers 58 and 60 is strictly under the control of the select-register-to-be-unloaded decoder 55 via the multiplexer 57. Thus the FROM address signals control the transfer of the indicator register data information and only for transfer to the data bus.

The queue registers are shown divided into a QR queue real time register 62 and a QS queue spare time register 64. Essentially, however, the queue registers are tied together to form one 16-bit register. The queue registers are used as an internal, variable timing source. The real time and the spare time queue registers are combined to form the 16-bit counter which is decremented by the IDE unit 70 for each micro-step time performed by the IDE unit 70. The IDE unit 70 performs each requested instruction through a series of microsteps. The queue register is decremented by each microstep. A Q-interrupt QINT signal is generated by the queue register when all 16 bits of the register are equal to zero. The outputs of both the real time queue register 62 and the spare time queue register 64 are sampled by logic circuitry shown as a zero count block 63. When the queue registers are equal to zero, a Q-interrupt signal is generated and directed to the interrupt address generator 44, see FIG. 2, to request an interrupt address signal from the interrupt address generator 44 if an interrupt has been requested by the peripheral devices via the I/O ports 11.

Special instructions can be used to preload the queue registers via the data bus to any selected value to control the number of microsteps formed by the IDE unit 70. The IDE unit 70 must switch between real and spare time to access both queue registers to accomplish the loading of the queue registers, but the basic logic unit is always in real time after the execution of an instruction to preload the queue registers. Therefore these special instructions must only be executed during the real time portion of the basic logic unit cycling.

Referring again to FIG. 2, the queue registers 62 and 64 together with the IDE logic unit 70 and the I/O port unit 11 can be used as a means of generating an interrupt to provide interval timing when a peripheral device does not supply the need timing signals. The device adapters in prior art applications would supply, a timing signal unique to the peripheral device. Data information comprising a count is loaded into the queue register by the IDE unit in accordance with an address supplied by the interrupt address generator. The address can contain specific information to be transferred to the queue register as a specific count locating the time for the next interrupt to service the same peripheral device again. The IDE unit can set the queue register to interrupt the other programs being performed by the IDE unit after any given interval of time. This capability is especially useful while communicating with asynchronous communication interfaces which do not provide timing from the peripheral devices. The timing can be supplied by the internal program of the BLU rather than the interface adapter. The queue register provides a programmable rather than a fixed timing.

The queue register can also be used to control the pulse width and signal frequency of the data information bit signals being received by an input/output port lead. Since the queue register can be loaded with any count amount by a program instruction, data information such as serial signals can be sampled and controlled by programming a count to be placed into the queue register such that, when decremented, the center of the data information bit signal can be sampled at appropriate times and selectively placed into a register for storage until a complete signal has been received. For instance, upon receiving an interrupt signal from the peripheral device such as a dataset, a count is gated into the queue register from the instruction read from memory according to the interrupt signal received. The queue register is decremented and, upon reaching zero, generates a Q interrupt signal which is sampled by the interrupt address generator. The interrupt address generator 44 generates an address which is used by the IDE unit 70 to extract the next instruction from the memory store. The instruction provides the necessary commands to sample the correct input/output port and the correct leads in the port. The next serial data information bit signal is then sampled and transferred into a register. A count is placed into the queue register representative of the time for the next serial data information signal. This is continued until a stop information is received.

The sampling of data signals is possible with a peripheral device that transmits data at a slow speed relative to the operations of the controller such as the dataset. The dataset generally transmits data at a line speed of approximately 5 kilo hertz while the controller can operate in the mega hertz range. The controller can perform many data processing steps before the dataset is ready with a succeeding bit signal. By using the queue register during transmission of data signals to the dataset, the frequency of the data signals can be selectively controlled by permitting an interrupt by the queue register at the appropriate time depending upon the frequency desired and the decrementing cycle time of the queue register. The port unit can be activated to change the data signal on one lead only via one flip-flop of the port register at the time specified by the queue register. The port lead changes relative position either high or low or not depending upon the data signal to be transmitted. This change or changeable time delineates the frequency of the transmitted data signal.

GENERAL REGISTERS

Along with the special registers shown in FIG. 6, the basic logic unit includes 14 general registers as shown in FIG. 7. Referring now to FIG. 7, the general registers are shown divided into a real time section comprising seven registers and a spare time section also comprising seven registers. The real time section has five working registers 48 and two program counters 49 with a similar number of registers usable during the spare time cycle of the basic logic unit. In the present embodiment, the general registers use a random access memory called micro-ram to form the individual storage sections of the registers.

The reading and writing of the micro-ram is controlled by a read decoder 45 and a write decoder 47, respectively. The read decoder 45 is controlled by the FROM address signals and a read select R-SEL signal generated by the instruction decoder and execution IDE logic unit 70. The write decoder 47 is controlled by the TO address signals, TA1–TA4, along with the R–SEL signal. The read and the write decoders are standard logic gates which, by selective encoding, actuate particular addressing of the micro-ram to cause the reading and the writing of the information into and out of the micro-ram unit. The internal logic for the read decoder 45 and the write decoder 47, along with the individual logic for the general registers, is obvious to a person skilled in the data processing art. Since the general registers are included merely to describe the operation of the basic logic unit it is not believed to be necessary to completely describe the internal workings of the general registers in the description of the present invention. The data information from the data bus 10 is transmitted to a particular general register under the control of the FROM address signals via the read decoder 45. The data information from the general registers are transmitted to the data bus under the control of the TO address signals via the write decoder 47.

The working registers 48 and 50 are generally designated as user registers, UR, or a user index, UX. When a working register is designated as a user register, it is a general working register whose content may be shifted left or right, combined logically or arithmetically with memory data, tested on a character or bit basis, used in I/O operations, transferred from or to any other unit, or compared to data information in another register. When the working register is used as a user index register, its content is added to the memory address word of the instruction. The result is an effective memory address value used in instruction execution which is variable by modifying the user index register content. The fifth working register has the additional special purpose of storing the masking signals used to control the interrupt address generator. The information stored in the fifth working register determines which of the input port leads are to be read for input data information or modified for outputting data information. Logically, for inputting data information to the basic logic unit, the content of the user register is the result of the fifth register ANDed with the user port information. For outputting data information, the contents of the user register are logically ANDed with the fifth working register information, and the two results are logically ORed together and transferred to the user port. The logic AND and OR operations are performed in the ALU/SHIFTER unit 46.

The two program counter PC registers 49 and 51 control the instruction sequence. The content stored in the program counter registers 49 and 51 is the memory address of the next instruction to be executed. The IDE unit 70 transfers the contents of the program counter to the address register 52, then updates the program counter value. The program counter value is also modified by particular instructions and the real time program counter is initialized each time an interrupt occurs.

The program counter register 49 or 51 in a normal sequence is incremented by one each time an instruction word is read from the memory units. The contents of the program counter is actuated when a jump, JMP, instruction signal indicates that a different portion of the memory is to be addressed. The program counter can receive data from the RAM memory and can store data into the RAM memory for performing subroutine linkages. The real time program counter 49 is used by the IDE logic to store the data information to start the interrupt service as described previously.

Also included in FIG. 7 is a portion of the instruction decode and execution unit 70, a FROM address encoder 300, and a TO address encoder 302. The FROM address encoder 300 generates the FROM address, FA1–FA4, signals and the FROM port signals. The FROM address signals, except for the control of the general registers, control the transfer of the data information from units such as the special registers and the interrupt address generator 44 to the data bus 10. The FROM-PORT signal activates the I/O ports 11 to transfer the data information coming from the peripherals into the basic logic unit. The AOUT or allow output signal is directed to the ALU/SHIFTER unit 76 to transfer data information from the multiplexer unit 200 (see FIG. 5b) to the data bus 10. The FROM address signals activate the transfer of the data information signals from the output register 205 into the multiplexer unit 200. The particular logic circuitry used in the FROM address encoder 300 is shown in FIGS. *7a* and *7b*.

The TO address encoder 302 generates the TO address, TA1–TA4, signals and the TO-PORT signal and the AIN signal. The TO address signals control the transfer of data information from the data bus to units of the basic logic unit such as the special registers. The TO address signals also control the writing of the information into the micro-ram general registers. The TO-PORT signal activates the I/O ports 11 to transfer the data information from the registers in the basic logic units to the I/O ports 11 and then to the peripherals connected thereto. The AIN or allow input signal is directed to the ALU/SHIFTER unit 46 to transfer data information from the data bus 10 into the input register 202 of ALU/SHIFTER unit 46. The particular logic configuration for the TO address encoder 302 is shown in FIG. *7c*.

Referring now to FIGS. *7a* and *7b*, the FROM address encoder generates the FROM address signals, the allow output signal, and the FROM-PORT signals as a result of the UO1–U16 signals from the micro-read only memory registers of the IDE unit 70, combined with the selective actuation of signals from the instruction register 56, the IR06, IR07, IR08 and IR16 signals, and the data register 54, the DR01, DR02 and DR03 signals. The signals extracted from the instruction register and the data register control the selection of the particular FROM address signal. The selection of the signals for control of the different units of the basic logic unit controller is an arbitrary selection and thus the exact configuration need not be further explained to disclose the present invention.

The allow out AOUT signal, see FIG. *7b*, directed to the ALU/SHIFTER 46 is generated by the instruction signals from the micro-read only memory register. Likewise the FROM PORT signal directed to the I/O ports 11 is generated by selected instruction signals from the micro-read only memory registers of the IDE unit 70.

Referring now to FIG. *7c*, the TO address encoder takes the U01, U02 and U12–U16 signals from the micro read only memory register in the IDE unit 70 and selectively combines these signals with the IR05, IR06, IR07 and IR16 signals from the instruction register 56 to develop the TO address TA1–TA4 signals, the allow input AIN signal for the ALU/SHIFTER 46 and the TO-PORT signal for the I/O ports 11. Again the selection of the signals to develop the TO address signals and the allow input AIN and TO-PORT signals is arbitrary and no discussion of the formation of these signals need be given here.

READ ONLY MEMORY

A block diagram of the read only memory (ROM) 66 used in the basic logic unit is shown on FIG. 8. The ROM 66 is a modular read only memory which is coded with the program instructions at the time of fabrication. Each ROM module stores eight bits of data information, MEM01–MEM08. A second module contains the second eight-bit group of data information, the MEM09–MEM16 signals. As shown in FIG. 8, several ROM modules comprise the entire read only memory 66. The number of ROM modules is limited by the total possible number of addresses which can be encoded in the address register 52, including those necessary to address the random access memory (RAM) 68.

To read an instruction from the ROM 66, the location address is first transferred to the address register 52. The information in the address register 52 is then transmitted to the ROM 66. The address register 52 activates the particular ROM module for transfer of the information stored in the address activated. The eight bits of information from the address are transferred to the data register 54 as the MEM01–MEM08 data signals. The information is then transferred from the data register 54 to the instruction decoding and execution unit 70 to activate the basic logic unit to perform the command encoded in the instruction obtained from the ROM 66. The read only memory 66 and the random access memory 68 comprise the main memory store of the basic logic unit.

RANDOM ACCESS MEMORY

The random access memory (RAM) 68 of the basic logic unit is shown in FIG. 9. The random access memory 68 stores the variable data for use by the system. The RAM 68 is organized in 16-bit words. However, since the functional units are connected by the eight-bit data bus, one-half of a memory word is selectively accessed at one time. Both the random access memory 68 and the read only memory 66 (see FIG. 8) are accessed by the address register 52 signals AR01–AR16. The RAM 68 is a modular read/write memory with a nondestruct read cycle. Each RAM section as shown in FIG. 9 provides one memory bit, MEM01–MEM16.

Referring to FIG. 9, each RAM unit includes an address generator. In order to read data from the RAM 68, the address register signals, AR01–AR16, are enabled to select the correct address via the address generator of each RAM to be scanned. Thus if the memory bits 1 through 8 are to be extracted, RAM 1–8 will be activated by the address register 52. The output enable signal will then be activated by the IDE unit 70 to effect the transfer of the MEM01–MEM08 signals for transfer to the data register 54. From the data register 54 the bit information read from the RAM 68 can be transferred around the basic logic unit for use therein. Since the RAM 68 according to the present embodiment is a nondestruct read cycle, it is not necessary to rewrite the information into the same location. The information to be changed is written over the top of the old information to effect a change.

On a write operation, the correct address register signals for the location to be written is first activated. During a write operation, 16 bits of information may be transferred from the data register 54 to the RAM 1–16 units. As shown on FIG. 9, the DR01 signal from the data register is stored in RAM No. 1 upon the activation of the RAM 68 by the WRITE signal. Thus upon the enabling of the WRITE signal all 16 RAM units are rewritten at the address location determined by the address register signals and the data information stored in the data register 54.

The electronic circuitry for the address generation and the random access memory units is well known in the art. Therefore, a further explanation of these units is not believed to be necessary since it is obvious that any type of memory including memory cores can be used as a random access memory capable of operating with the present embodiment.

INSTRUCTION DECODE AND EXECUTION UNIT

A block diagram of the instruction decode and execution unit 70 used in the basic logic unit is shown in FIG. 10. The IDE unit 70 is the main controlling unit for the entire basic logic unit. The IDE unit contains its own read only memory, a micro ROM 310. The micro ROM 310 is addressed by a micro ROM decoder 312 driven by the U07–U16 signals from the micro ROM and the IR01–IR16 signals from the instruction registers 56. The tie-back signals from the micro ROM 310 to the micro ROM address decoder 312 is used to perform an address jump within the micro ROM 310 itself. The indicator register signals contain the instruction signals taken from the main ROM 66. The U signals from the micro ROM 310 are used in three decoders, a jump conditional decoder 304, a command decoder and register 306, and a micro indicator register 308. The jump conditional decoder 304 issues the signals that control the main operation features of the basic logic unit. The command decoder and register 306 issues the signals for the arithmetic and logical unit 46 and to instruct the memory store to read and write signals from the special registers. The micro indicator register 308 obtains the signals stored in the register from the data information bit signals B1–B8 from the data bus. The indicator register stores the information signalling the basic logic unit of a zero, an odd, or a carry indication.

The micro ROM address decoder 312 and the micro ROM 310 can be standard modular read only memories which are coded with the program instructions at the time of fabrication. Each micro ROM module stores four bits of data information, U01–U04, for instance, with the other units storing the other information to comprise all of the U signals. Since the makeup of the read only memory and the logic for addressing a read only memory is well known in the art, the internal structure and logic configuration of the micro ROM 310 will not be shown here. A logic configuration for decoding the halt, jump (JMP), decode 1 (DEC1), decode 2 (DEC2), and the increment of the micro address decoder (UA INC) as generated by the jump conditional decoder 304 is shown in FIGS. 10*b*, 10*c* and 10*d*. A logic configuration for use in the command decoder and register 306 is shown in FIGS. 10*a* and 10*b*. The command decoder and register 306 generates the complement (COMP) signal, the increment (INC) signal, the C1 and C2 signals for the arithmetic and logical unit, the test enable (TEST-EN) signal to perform tests on the equipment, the read selection (R-SEL) signal, the inhibit read (INH-R) signal, and the write signal. The logic for the micro indicator register 308 is shown in FIG. 10*b*.

FIGS. 10*a*, 10*b*, 10*c* and 10*d* are interconnected according to the diagram shown in FIG. 10*e*. The output signals from the micro ROM 300 are directed to logic gates in a specific order to arrive at the output signals as shown on FIG. 10. Since the selection of the signals are basically a matter of discretion, the logic configuration shown in FIGS. 10*a*–10*d* will not be discussed in detail. The logic is shown here as representative of a preferred embodiment and a means for accomplishing the instruction signals. A four input to 10 output multiplexer unit 320 is shown on FIG. 10*a*. The multiplexer 320 is a standard item for encoding 10 outputs according to a four input binary signal. The remaining logic components on FIGS. 10a–10d are standard items and the operation thereof is well known to a person skilled in the art and therefore a complete description of each figure is not believed to be necessary here.

OPERATION

The operation of the basic logic unit will now be discussed by referring in general to FIGS. 1–10 and especially FIG. 2 along with FIG. 11 which shows the instruction format for the basic logic unit and FIGS. 12a–f to show an operation of the basic logic unit.

Referring to FIG. 11, the basic logic unit instructions are either two words, 32 bit signals, or one word, 16 bit signals. The bit 01 of an instruction determines whether one word or two words are required for the entire instruction. Bit 01 is a "1" for a two-word instruction and a "0" for a one-word instruction.

Referring now to FIG. 11, the instructions of the two-word instructions are located in the instruction register and the data register for decode and execution. Bit signals 01–16 are stored in the instruction register and bit signals 17–32 are stored in the data register. The first 5 bit signals of each instruction form the operation code. These 5 bits, 01–05, are used by the decode 1 commands as will be described later in the flow chart of FIG. 12. If the instruction operates on one of the working registers, that register, called the user register, is specified in bit signals 06, 07 and 08 of the instruction. For two-word instructions that operate on a user register and memory data, bit signals 09–15 of the instruction form an extended operation code. These bit signals are used by the decode 2 command as explained later in the flow chart of FIG. 12. These instructions also specify which half of the memory word is to be accessed. Bit 16 of the instruction is a 0 or a 1 to specify the right or left half of the memory store, respectively.

The second 8 bit signals of a two-word instruction may also specify an immediate operand, with the data to be stored in memory store, or the bit configuration to be used for one of the four conditional jump instructions. The SUB instruction, subroutine call, uses bit signals 09–16 to specify the random access memory address in which the return linkage is to be stored. The information in the program counter is stored in this location and this location plus 1. Two-word instructions that reference the memory store for data or jump designations have the memory address in bits 20–32 of the instruction. Bit signals 17–19 of the instruction indicate which, if any, of the general registers is to be used as a user index register. The contents of the user index register is to be added to the base memory address to obtain the effective memory address.

The add to Q register (ADQ) and load to Q register (LDQ) instructions contain the value to be added to or loaded to the internal decrementing Q counter register. The least significant half, instruction bit signals 25–32, is added to the real time part of the Q register, the most significant half, bits 17–24, is added to the spare time portion of the Q counter register. The bit signals 12–16 of the one-word shift instructions determine how the user register is to be shifted. Bit signal 12 enables a left shift, bit signal 13 enables a right shift, and bit signals 14–16 specify the number of bit position that the user register is to be shifted. Bit signals 11–16 of the input/output instructions specify which port of the input/output port unit 11 is to be accessed. The input/output port unit 11 is modular in groups of 5 ports with up to 6 port groups. Therefore, bit signals 11–13 specify the port group, and bit signals 14–16 specify the port in the group. The one-word instructions can load, add, perform logical functions, or OR an immediate operand to a user register. This immediate operand is in the second 8 bits of the instruction and is loaded in the data register during decode and execution. The subroutine return instruction uses bit signals 9–16 to specify first of two random access memory locations from which the program counter will be loaded to return from a subroutine.

The instructions shown in FIG. 11 will: load a register from a memory location or store a register or constant data to a random access memory location; compare a register to a memory location; perform arithmetic and logic operations between a register and a memory location or between an immediate operand and a register; jump conditionally or unconditionally; output information from a register to a port; input information from a port to a register; shift a register; call or return from a subroutine; and switch from real to spare time. The operation code signal is shown in FIG. 11. On the same line is the actual command executed by the basic logic unit.

The instruction cycle of the basic logic unit begins by forming the interrupt overhead if an interrupt has occurred and if the basic logic unit is in spare time. The interrupt overhead switches the IDE logic unit 70 from spare time to real time to service an interrupt. The cycle proceeds by transferring the program counter 49 to the memory address register 52 and then to read the word designated by the memory address register 52 into the data register 54. The program counter 49 is then incremented. If the instruction is a two-word instruction, the second word is read and the program counter 49 is again updated. The first half of the instruction is placed in the instruction register 56. The second half of the instruction remains in the data register 54. The instruction operation code in the instruction register 56 is decoded to determine what instruction has been read from the memory store. The instruction execution will include at least one of the following: combine the instructions immediate operand with one of the working registers 48 or 50 through the arithmetic and logic unit 46, and place the results in the working register; use the arithmetic and logic unit 46 to transfer appropriate register bits to one of the ports; use the arithmetic logic unit 46 to extract appropriate port data and place this information in a register; read or write memory data at the location specified by the instruction; use the arithmetic and logic unit 46 to combine memory data and register data, with the results placed in the same register or in the data register 54 to be written later in the random access memory store 68; the program counter 49 may be modified by a jump instruction; use the shifter to shift a register with the results placed in the register; set the indicator register 58 to show whether the arithmetic logic unit resultant was a zero or a non-zero, odd or even, or if there was a carry or not; switch the mode of the terminal from real time to spare time; use the arithmetic logic unit 46 to compare a register with data signals read from the memory store or with an immediate operand; or set a flag bit signal for the halt instruction, the next sequential instruction will halt at the time the first half of the instruction is placed in the instruction register 56.

When the designated instruction has been executed, the micro ROM 310 transfers control to check for an interrupt or if none, to process the next instruction. On a power turn-on, the basic logic unit has a special start up sequence. The sequence initializes the spare time and real time program counter values from the last memory locations. The basic logic unit will then start processing instructions in real time.

The basic logic unit has four indicators, interrupt or nol, carry or not, zero or non-zero, and odd or even. The interrupt indicator is set by the interrupt address generator 44 and is reset by the interrupt address generator when the interrupt has been serviced and no other interrupts are present. The carry indicator is set by an add instruction that generates a carry.

Interrupts may be selectively masked or disabled by connecting an output port lead to the appropriate interrupt address generator mask input, M1–M8, see FIG. 4. If the output lead is set, the interrupt address generator will reset any existing interrupt on that lead. When the output lead is reset, that interrupt is processed normally.

An input/output port 11 may contain input and/or output leads for one or several peripheral devices. To allow the basic logic unit input and output instruction to obtain selected inputs and to modify only the desired output leads, the working register 48 or 50 is used as an input/output lead mask. Instruction bit signals set in the working register determine which port leads are to be obtained for input or modified for output by using the arithmetic and logic unit 46 to combine the instruction signals in the working register with the input data or the output data signals.

Referring now to FIGS. 12*a–f*, when power is initially applied to a basic logic unit, all of the input/output port leads are set to zero, the spare time indicator is set, the flags are reset, and the address registers are cleared. The program starts executing instructions from the first location in the micro ROM. The circle designation on FIGS. 12*a–e* contain the exit and extrance labels and indicate the place of re-entry of the program into the flow chart.

To start an instruction cycle, the execution of each combined memory instruction starts by interrogating the real time and spare time with no interrupts. If an interrupt has occurred or if the program is in real time, the instructions jump to transfer the program counter 51 to the address register 52. If not, the interrupt address is transferred to the address register 52, the instructions are placed into real time, the instructions are transferred from the read only memory to the program counter 51, and an interrupt indicator is set to start the rest of the instructions.

The program continues by transferring the information in the program counter 51 to the address register 52. The instruction is read from the memory store and transferred to the data register 54. The program counter information is then updated from the data register and the first word is transferred from the data register 54 to the instruction register 56. If a one-word instruction is present the flow branches directly to enter the decode 1 command. If it is not a one-word instruction, the flow continues to transfer the second word from the data register 54 to the instruction register 56 and to transfer the program counter 51 to the address register 52 to read the second instruction from memory and to transfer that instruction to the data register. The program counter is then updated by the information in the data register and the flow continues to enter the decode 1 command.

Figure 12A:
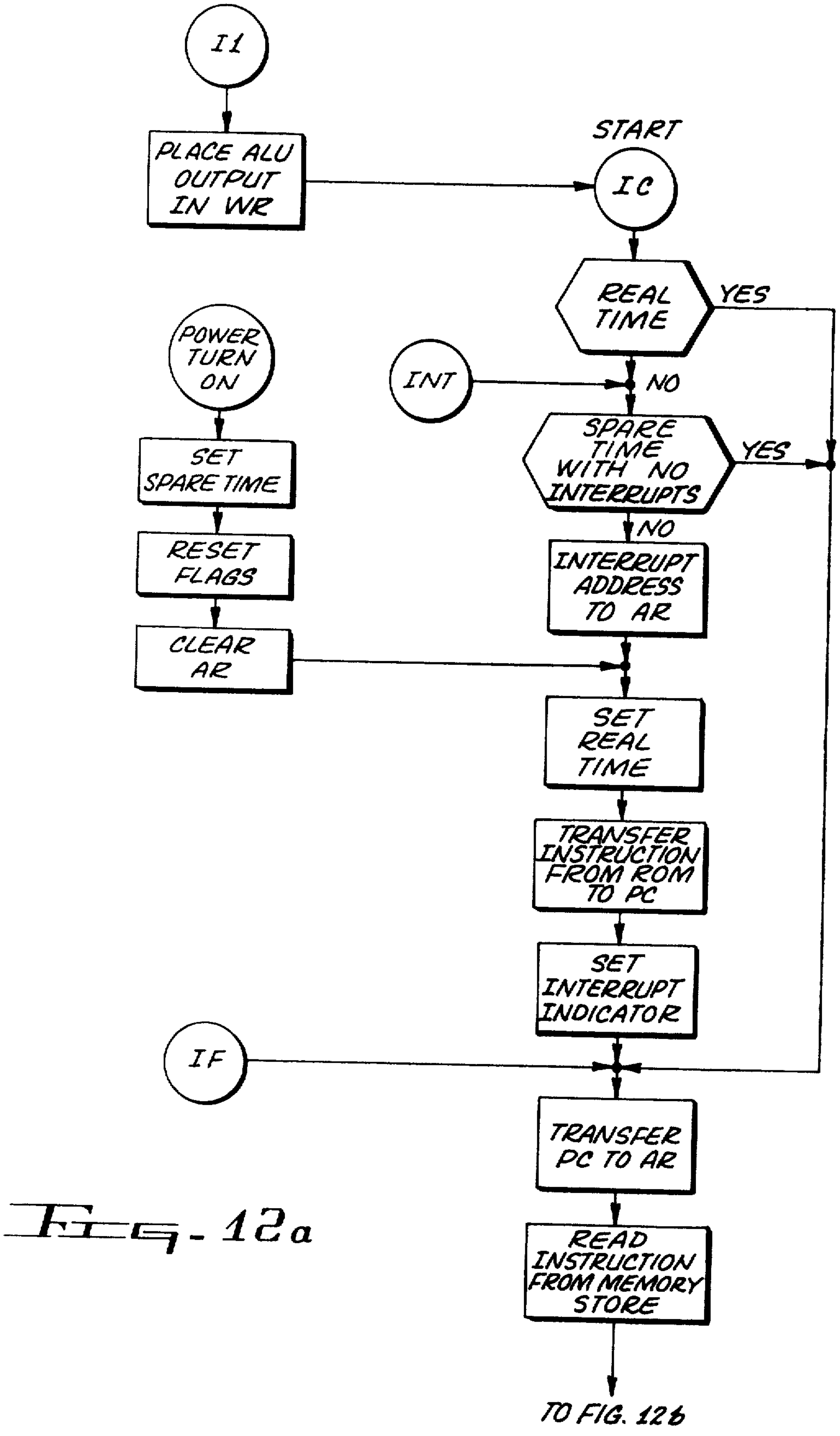
Figure 12B:
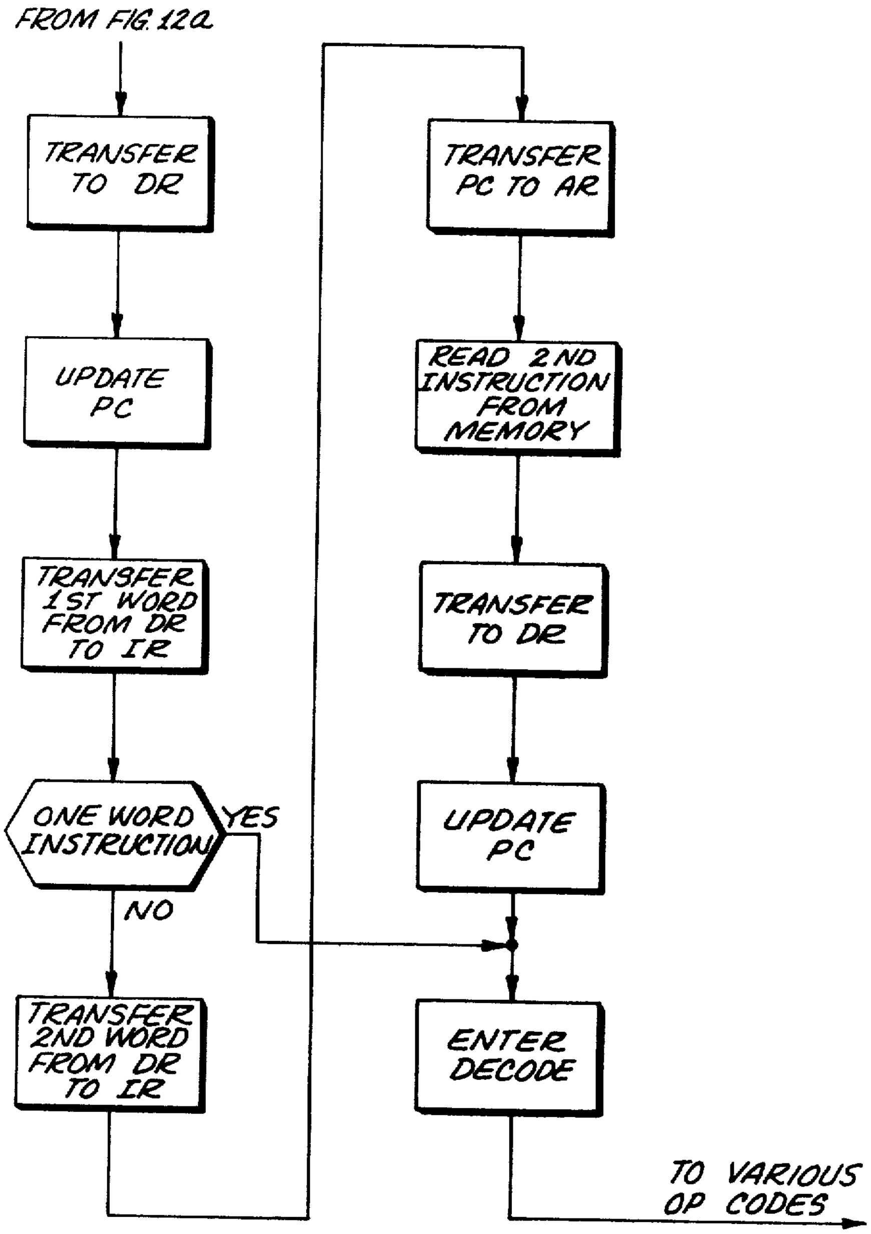
Figure 12C:
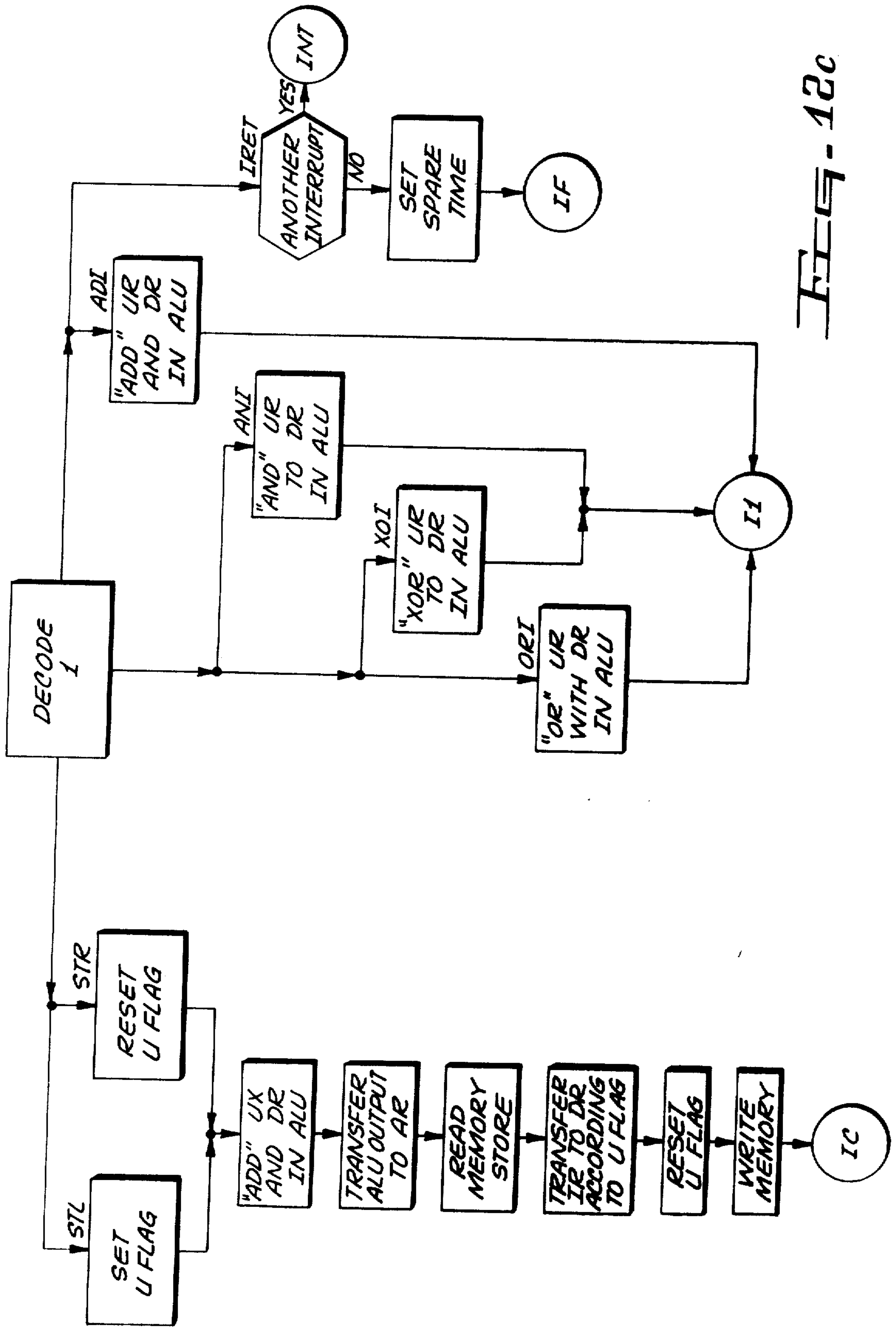
Figure 12D:
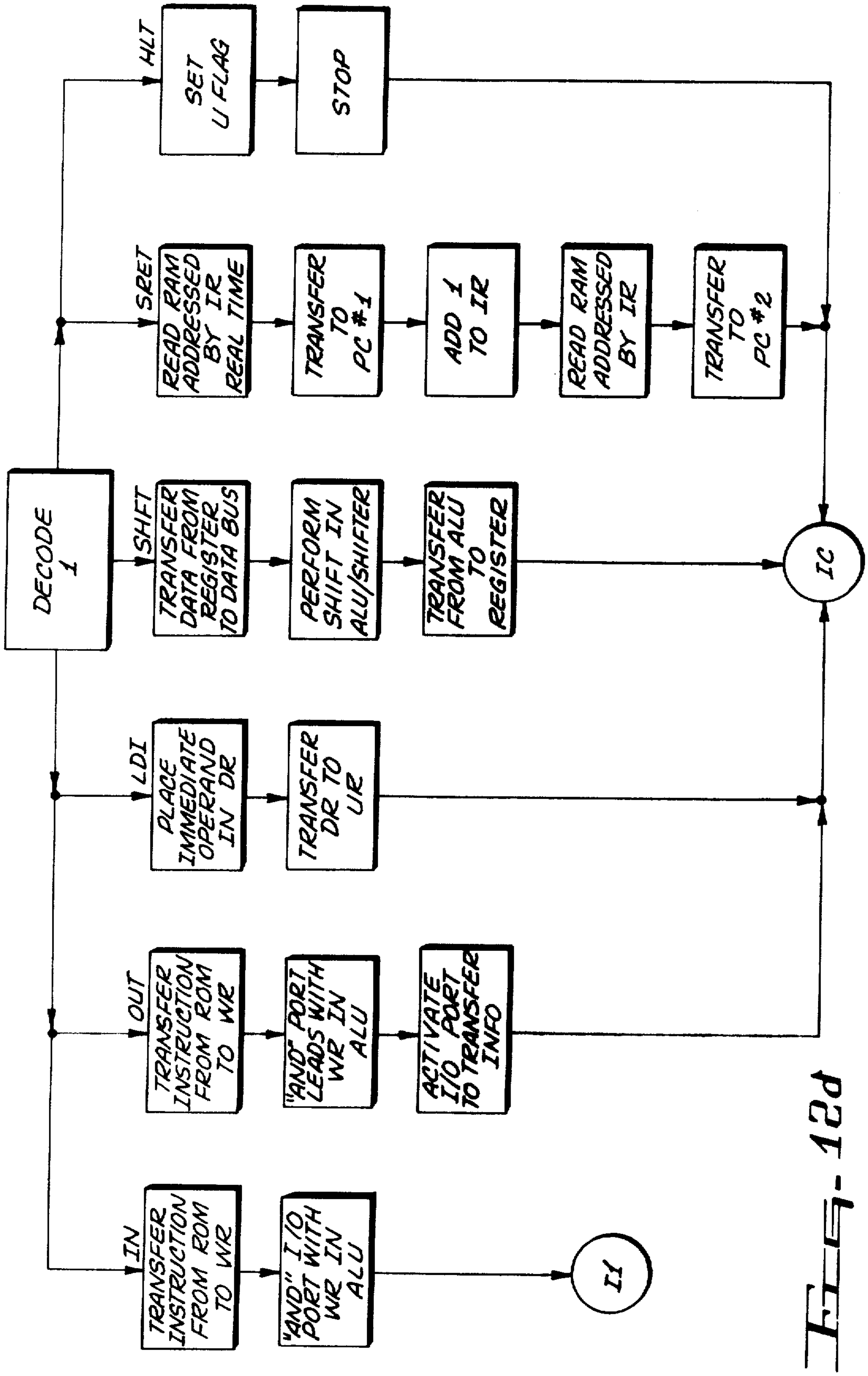
Figure 12E:
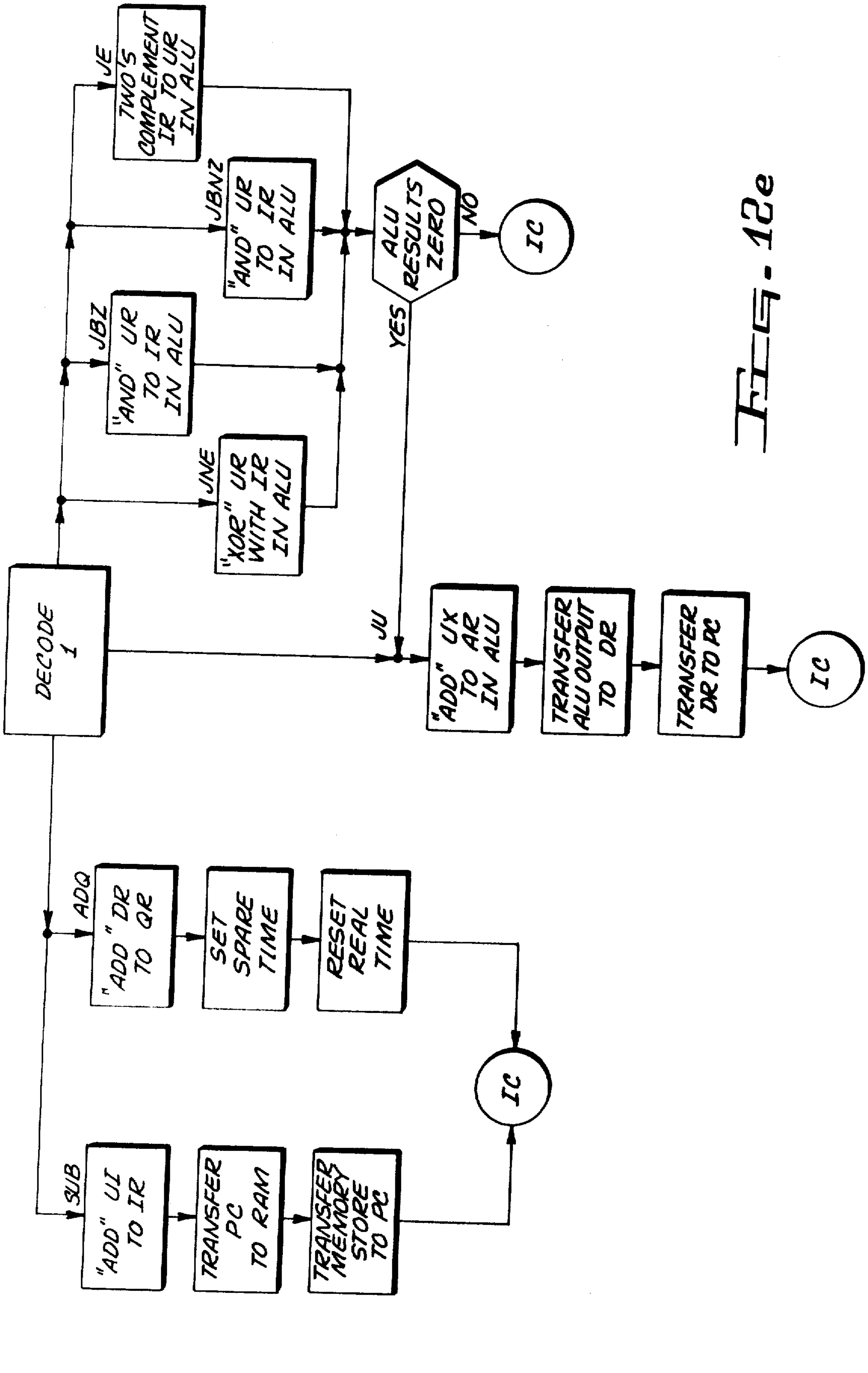
Figure 12F:
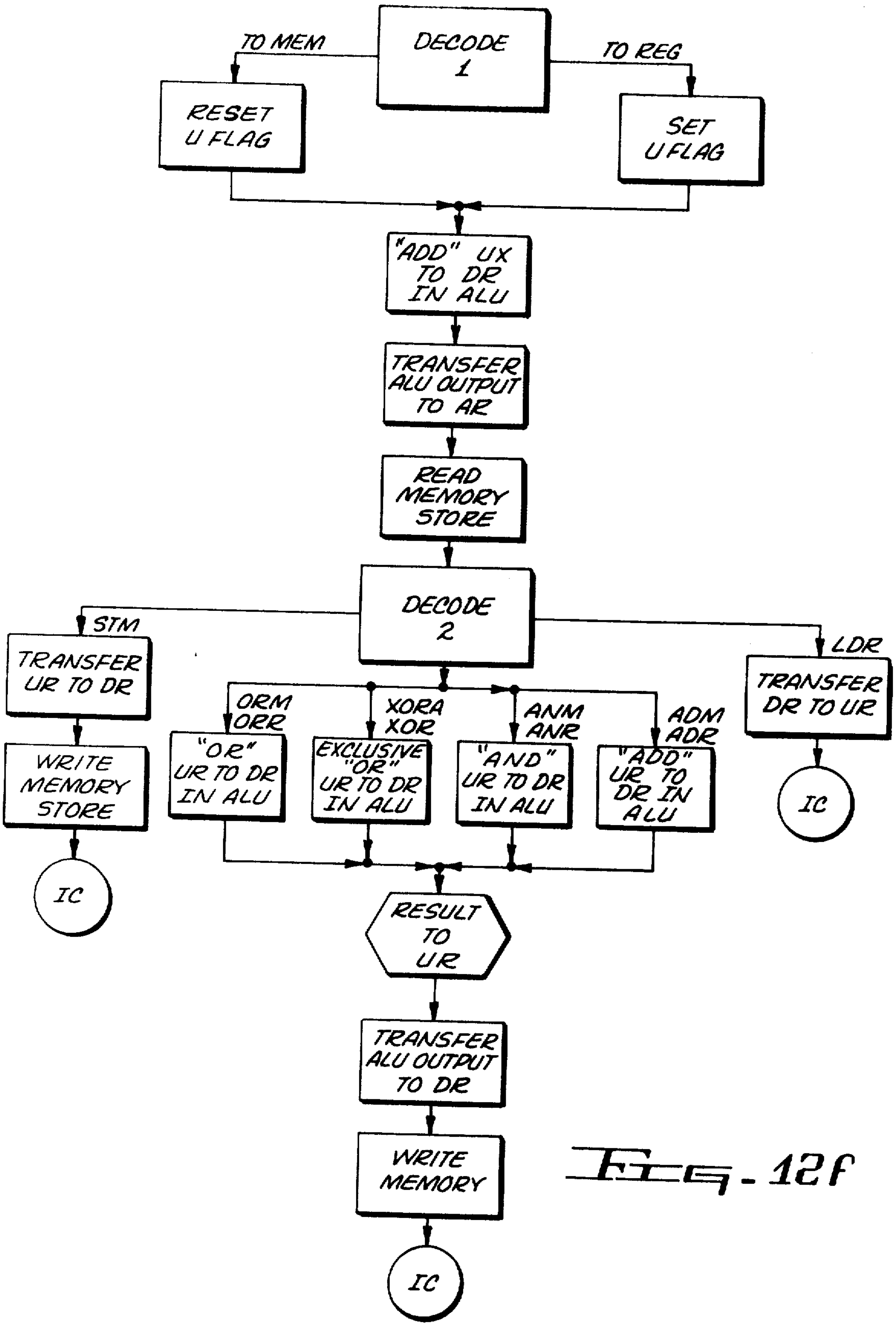

The decode 1 commands are continually executed until the flag for the decode 1 is reset. The decode 1 commands are executed as per the OP codes as shown in FIG. 11. The decode 2 commands are entered if an OP code is designated for a particular instruction to store, load, or perform a logical function to the memory store or to a register. If these OP codes are selected (see FIG. 11) the flow as shown on FIG. 12*e* is followed either to set or reset the U flag. The working register being used as a user register is added to the data register 54 in the arithmetic and logical unit 46, and the output is then transferred to the address register 52 to read the memory store. The decode 2 commands are then entered and performed. After the decode 1 or the decode 2 commands are completed, the flow returns via the IC or the I1 designations to return to the start of the instruction execution. The flow returns to the IF portion of the flow if no more interrupts are present in the interrupt address generator 44. If the interrupt return (IRET) decode 1 OP command instruction is read, and another interrupt is present, the flow returns via the INT circle to start the flow again at the beginning.

Thus what has been shown and discussed is a basic logic unit or controller which can operate as a data processing system to control many different peripheral devices. In FIG. 1, the basic logic unit is shown attached for use with a bank teller terminal. It is obvious that other usages and other peripheral devices can be combined to form a point of sale terminal in a retail store, for instance. This adaptation and the logic circuitry used in the description of the preferred embodiment should not be taken as limiting the present invention. Likewise the layout of the instruction format of FIG. 11 should not limit the present invention since it is obvious that other binary bit signals than that shown could be used to perform the instructions described herein.

While the principles of the invention have now been made clear in an illustrated embodiment, there will be immediately obvious to those skilled in the art many modifications of structure, arrangement, proportion, the elements, materials and components, used in the practice of the invention, and otherwise, which are particularly adopted for specific environments and operating requirements without departing from these principles. The appended claims are, therefore, intended to cover and embrace any such modifications, with limits only of the true spirit and scope of the invention.

We claim:

1. A data processing system including a plurality of terminal devices and a controller for receiving, processing and transmitting data signals to said terminal devices, said controller comprising:

a data bus for bidirectionally transporting sets of bit information signals;

a port unit including a plurality of input/output ports;

a plurality of port registers in each of said input/output ports, each port register having its input connected to said data bus for storing one bit informaiton signal;

a plurality of multiplexing means each sampling one bit signal from all input/output ports and directing its output to said data bus as one bit of the set of bit information signals;

a plurality of bidirectional leads, each lead connected to one output of one port register and to one input of each of said plurality of multiplexing means, a group of said plurality of bidirectional leads connected to one of said terminal devices;

a main memory store having addressable storage locations responsive to first address signals in the form of a set of bit information signals;

a plurality of registers connected to said data bus to store bit information signals representative of data and instructions being processed by the controller and, when actuated, for directing the data and instructions as a set of bit information signals to said data bus;

said main memory store connected to one of said plurality of registers for receiving said first address signals in the form of a set of bit information signals received from said terminal devices and directed to said data bus via one of said plurality of port registers, and, when actuated, for delivering data and a second address signal to another of said plurality of registers as a set of bit information signals; and an instruction decode and execution unit including a fast access memory store having addressable storage locations responsive to said second address signals for generating a plurality of command signals controlling the transfer of data signals to and from the terminal devices via said port unit and to and from said data bus among the units, registers and main memory store.

2. A data processing system as defined in claim 1 wherein said controller further includes an arithmetic, logical and shifting unit connected to said data bus for performing arithmetic, logic and shift functions on the set of bit information signals received from said data bus to obtain a resultant signal and, when actuated, for directing the resultant signal to said data bus as one set of bit information signals.

3. A data processing system as defined in claim 1 wherein said controller further includes an interrupt address generator connected to said port unit to receive and detect request signals representative of requests by the terminal devices for access to the controller said interrupt address generator including priority means for selectively servicing a highest priority of said request signals as determined by the connection of the terminal device request signals to said port unit, said interrupt address generator responsive to a highest priority request signal to generate an interrupt signal for interrupting a process being performed by the controller and to generate an address signal to said main memory store to retrieve an instruction from said main memory store.

4. A data processing system as defined in claim 1 including means for logically combining sets of bit information signals and wherein the instruction signals from the main memory store and the instructions from the fast access memory store are directed to said combining means to modify or not said fast access memory store instructions to obtain resultant control signals which control the generation of said plurality of command signals by said instruction decode and execution unit.

5. A data processing system including a plurality of terminal devices and a controller for receiving, processing and transmitting data signals to said terminal devices, said controller comprising:

a data bus for bidirectionally transporting sets of bit information signals;

a port unit including a plurality of input/output ports;

a plurality of port registers in each of said input/output ports, each port register having its input connected to said data bus for storing one bit information signal;

a plurality of multiplexing means each sampling one bit signal from all input/output ports and directing its output to said data bus as one bit of the set of bit information signals;

a plurality of bidirectional leads, each lead connected to one output of one port register and to one input of each of said plurality of multiplexing means, a group of said plurality of bidirectional leads connected to one of said terminal devices;

an interrupt address generator connected to said port unit to receive and detect request signals representative of requests by the terminal devices for access to the controller, said interrupt address generator including priority means for selectively servicing a highest priority of said request signals as determined by the connection of the terminal device request signals to said port unit, said interrupt address generator responsive to a highest priority request signal to generate an interrupt signal for interrupting a process being performed by the controller and to generate an address signal to a main memory store;

said main memory store having addressable storage locations responsive to first address signals in the form of a set of bit information signals;

a plurality of registers connected to said data bus to store a set of bit information signals representative of data and instructions being processed by the controller and, when actuated, for directing the data and instructions as a set of bit information signals to said data bus;

said main memory store connected to one of said plurality of registers for receiving said first address signals in the form of a set of bit information signals received from said terminal devices and directed to said data bus via one of said plurality of port registers, and, when actuated, for delivering data and second address signals to another of said plurality of registers as a set of bit information signals; and an arithmetic, logical and shifting unit connected to said data bus for performing arithmetic, logic and shift functions on the set of bit information signals received from said data bus to obtain a resultant signal and, when actuated, for directing the resultant signal to said data bus as one set of bit information signals; and an instruction decode and execution unit including a fast access memory store having addressable storage locations responsive to said second address signals for delivering control signals, said control signals being directed to said arithmetic, logical and shifting unit as a set of bit information signals for logical combination with a set of bit information signals from said port unit to modify or not said control signals to obtain resultant control signals, said instruction decode unit in response to said resultant control signals and to said interrupt signal generating a plurality of command signals controlling the transfer of data signals to and from the terminal devices via said port unit and to and from said data bus among the units, registers and main memory store.

6. A data processing system including a plurality of terminal devices and a controller for receiving, processing and transmitting data signals to said terminal devices, said controller comprising:

a data bus for bidirectionally transporting a set of bit information signals;

a port unit including a plurality of input/output ports;

a plurality of port registers in each of said input/output ports, each port register having its input connected to said data bus for storing one bit information signal;

a plurality of multiplexing means each sampling one bit signal from all input/output ports and directing its output to said data bus as one bit of the set of bit information signals;

a plurality of bidirectional leads, each lead connected to one output of one port register and to one input of each of said plurality of multiplexing means, a group of said plurality of bidirectional leads connected to one of said terminal devices;

a main memory store having addressable storage locations responsive to first address signals in the form of the set of bit information signals;

an address register connected to receive and store bit information signals representing address signals from said data bus and to direct the first address signals to said memory store;

a data register connected to receive and store data information signals signifying data and second address signals from said memory store and said data bus, and, when actuated, to direct the data information signals to said data bus as a set of bit information signals;

an arithmetic, logical and shifting unit connected to said data bus for performing arithmetic, logic and shift functions on the set of bit informaiton signals received from said data bus to obtain a resultant signal and, when actuated, for directing said resultant signals to said data bus as a set of bit information signals;

a program counter register connected to said data bus to store a set of bit information signals representative of instructions to be performed and, when actuated, for directing the set of bit information signals to said data bus;

a plurality of general registers connected to said data bus to store a set of bit information signals representative of data being processed by the controller and, when actuated, for directing the set of bit information signals to said data bus;

an instruction decode unit including a fast access read only memory store having addressable storage locations; and an instruction register connected to said data bus to receive and store a set of bit information signals representative of instructions to be performed and, when actuated, to direct the set of bit information signals via said data bus to said instruction decode and execution unit;

said fast access read only memory store receiving the bit information signals representing instructions from said instruction register as the second address signals for retrieving control signals, said control signals being directed to said arithmetic, logical and shifting unit as a set of bit information signals for logical combination with a set of bit information signals from said port unit to modify or not said control signals to obtain resultant control signals, said instruction decode unit in response to said resultant control signals generating a plurality of command signals controlling transfer of data signals to and from the terminal devices via said port unit and the transfer of sets of bit information signals onto said data bus among the units and registers.

7. A data processing system as defined in claim 6 wherein said controller further includes an interrupt address generator connected to said port unit to receive and detect request signals representative of requests by the terminal devices for access to the controller said interrupt address generator including priority means for selectively servicing a highest priority of said request signals as determined by the connection of the terminal device request signals to said port unit, said interrupt address generator responsive to a highest priority request signal to generate an interrupt signal for interrupting a process being performed by the controller and to generate an address signal to said main memory store to retrieve an instruction from said main memory store.

8. A data processing system as defined in claim 6 including means in the instruction decode and execution unit for controlling the controller by performing the steps of:

a. forming an interrupt overhead if a terminal device has requested service;
b. transferring the signal in the program counter to the memory address register;
c. transferring the instruction signals designated by the memory address register from the main memory store into the data register;
d. incrementing the program counter;
e. transferring the instruction signals from the data register into the instruction register;
f. transferring the instruction signals from the instruction register into the instruction decode and execution unit;
g. performing the operation designated by the instruction signals; and
h. generating a plurality of command signals according to the instruction signals.

9. A data processing system as defined in claim 8 including means in the instruction decode and execution unit for generating the command signals to execute at least one of the following steps:

a. combining the instruction signals from the instruction register with the signals in the general register through the arithmetic, logical and shifting unit;
b. transferring signals from a general register to the port register selected by the command signal;
c. transferring data signals from the multiplexer means selected by the command signal to the general register;
d. reading or writing memory data in the address location specified by the command signal; and
e. combining data signals with signals from the general register in the arithmetic, logical and shifting unit.

* * * * *